US009380613B2

(12) United States Patent
Luna

(10) Patent No.: US 9,380,613 B2
(45) Date of Patent: Jun. 28, 2016

(54) MEDIA DEVICE CONFIGURATION AND ECOSYSTEM SETUP

(71) Applicant: Michael Edward Smith Luna, San Jose, CA (US)

(72) Inventor: Michael Edward Smith Luna, San Jose, CA (US)

(73) Assignee: AliphCom, San Francisco, CA (US)

( * ) Notice: Subject to any disclaimer, the term of this patent is extended or adjusted under 35 U.S.C. 154(b) by 0 days.

(21) Appl. No.: 13/831,485

(22) Filed: Mar. 14, 2013

(65) Prior Publication Data

US 2014/0269651 A1    Sep. 18, 2014

(51) Int. Cl.
| | |
|---|---|
| H04W 76/02 | (2009.01) |
| H04W 4/00 | (2009.01) |
| H04L 29/06 | (2006.01) |
| G06F 9/44 | (2006.01) |
| H04M 1/00 | (2006.01) |
| H04L 12/24 | (2006.01) |

(Continued)

(52) U.S. Cl.
CPC .............. *H04W 76/02* (2013.01); *G06F 8/00* (2013.01); *H04L 41/00* (2013.01); *H04L 41/0803* (2013.01); *H04L 63/18* (2013.01); *H04L 67/30* (2013.01); *H04M 1/00* (2013.01); *H04W 4/001* (2013.01); *H04W 4/008* (2013.01); *H04W 76/023* (2013.01); *G06F 8/61* (2013.01); *H04L 67/34* (2013.01); *H04M 1/7253* (2013.01); *H04M 1/72525* (2013.01); *H04W 4/003* (2013.01); *H04W 84/18* (2013.01)

(58) Field of Classification Search
CPC ........ H04W 76/02; H04W 8/22; H04W 4/008
USPC .......................................... 370/331, 328, 338
See application file for complete search history.

(56) References Cited

U.S. PATENT DOCUMENTS

| 8,645,511 B2 | 2/2014 | Liu et al. |
| 2003/0013503 A1 | 1/2003 | Menard et al. |

(Continued)

FOREIGN PATENT DOCUMENTS

| WO | 2014160516 | 10/2014 |
| WO | 2014186039 | 11/2014 |

OTHER PUBLICATIONS

Young, Lee W.; International Searching Authority; Notification of Transmittal of the International Search Report and the Written Opinion of the International Searching Authority, or the Declaration, mailed on Aug. 28, 2014 for International Patent Application No. PCT/US2014/029779.

(Continued)

*Primary Examiner* — Jae Y Lee
(74) *Attorney, Agent, or Firm* — Kokka & Backus, PC

(57) ABSTRACT

Embodiments relate generally to electrical and electronic hardware, computer software, wired and wireless network communications, and portable and wearable media devices. Media devices may include a plurality of RF transceivers and an audio system. The RF transceivers and/or audio system may be used to wirelessly communicate between media devices and allow configuration and other data to be wirelessly transmitted from one media device to another media device. A user device may be used to Bluetooth® (BT) pair with a media device and to install a configuration on the media device. Other media devices may be configured using the configuration without breaking the BT pairing and without the other media device having to BT pair with the user device. Each media device may include at least one antenna and may include an antenna that is de-tunable.

15 Claims, 20 Drawing Sheets

(51) Int. Cl.
  *H04W 84/18* (2009.01)
  *H04L 29/08* (2006.01)
  *H04M 1/725* (2006.01)
  *G06F 9/445* (2006.01)

(56) References Cited

U.S. PATENT DOCUMENTS

| | | |
|---|---|---|
| 2004/0146031 A1 | 7/2004 | Jukarainen |
| 2005/0075128 A1 | 4/2005 | Diedrich et al. |
| 2006/0258289 A1* | 11/2006 | Dua .............................. 455/41.3 |
| 2006/0281454 A1 | 12/2006 | Gray |
| 2008/0091596 A1 | 4/2008 | Labaton |
| 2009/0254857 A1 | 10/2009 | Romine et al. |
| 2010/0005452 A1 | 1/2010 | Anson et al. |
| 2010/0082489 A1 | 4/2010 | Lin et al. |
| 2010/0082784 A1* | 4/2010 | Rosenblatt et al. ........... 709/222 |
| 2010/0123662 A1 | 5/2010 | Sadler |
| 2010/0153148 A1 | 6/2010 | Johnson et al. |
| 2010/0278345 A1 | 11/2010 | Alsina et al. |
| 2011/0112926 A1 | 5/2011 | Kerr et al. |
| 2011/0143664 A1 | 6/2011 | Fuccello et al. |
| 2011/0156861 A1 | 6/2011 | Alameh |
| 2012/0079095 A1 | 3/2012 | Evans et al. |
| 2012/0291139 A1 | 11/2012 | Nakamura |
| 2013/0039352 A1 | 2/2013 | Ruster et al. |
| 2013/0177166 A1 | 7/2013 | Agevik et al. |
| 2014/0029494 A1 | 1/2014 | Sundaram et al. |
| 2014/0171120 A1 | 6/2014 | Callahan |
| 2014/0279122 A1 | 9/2014 | Luna |

OTHER PUBLICATIONS

Young, Lee W.; International Searching Authority; Notification of Transmittal of the International Search Report and the Written Opinion of the International Searching Authority, or the Declaration, mailed on Oct. 28, 2014 for International Patent Application No. PCT/US2014/026897.

Bargeon, Brittany E.; USPTO Office Action mailed Jun. 20, 2014 for U.S. Appl. No. 13/802,528.

Bargeon, Brittany E.; USPTO Office Action mailed Feb. 11, 2015 for U.S. Appl. No. 13/802,528.

Bargeon, Brittany E.; USPTO Office Action mailed Sep. 17, 2015 for U.S. Appl. No. 13/802,528.

* cited by examiner

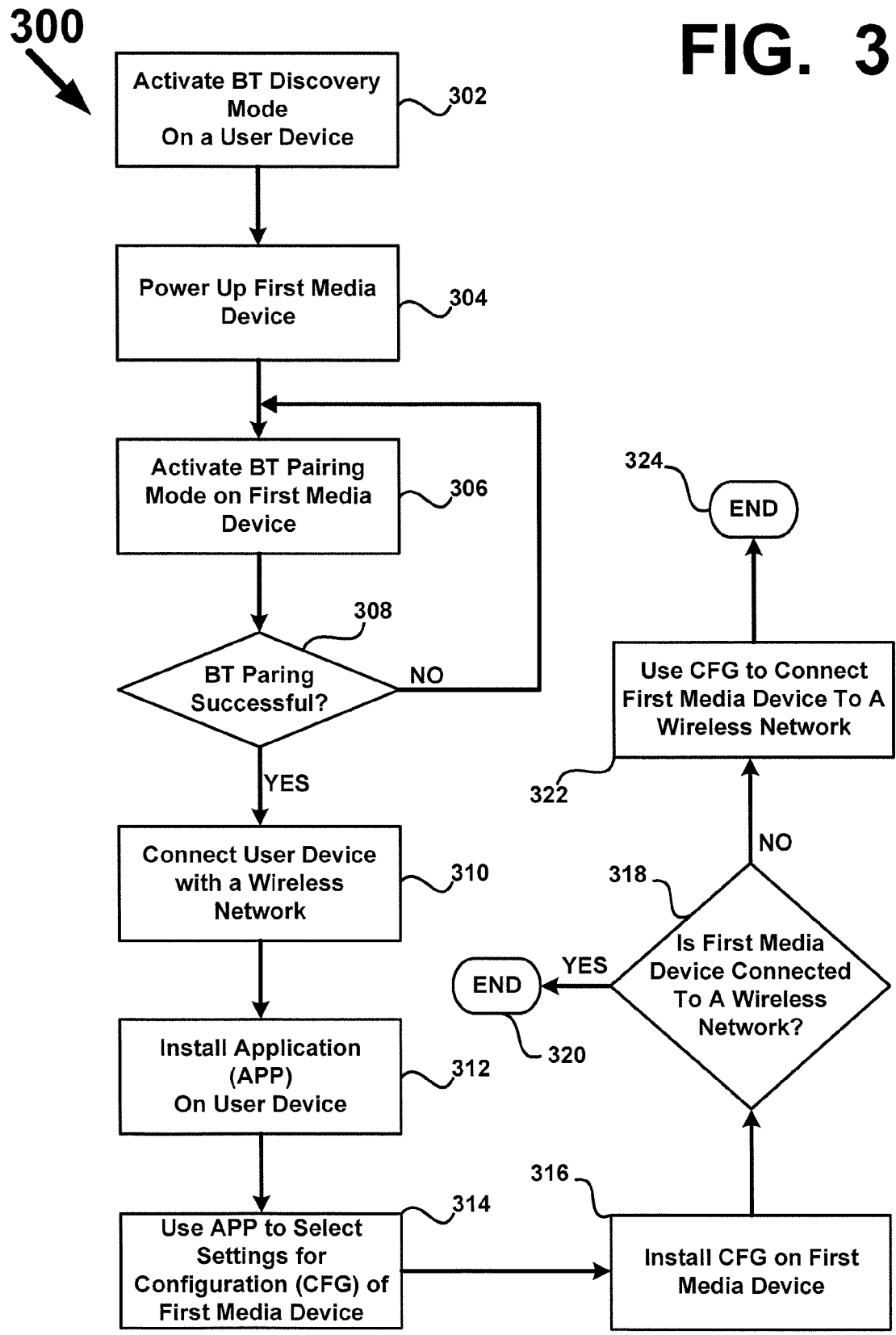

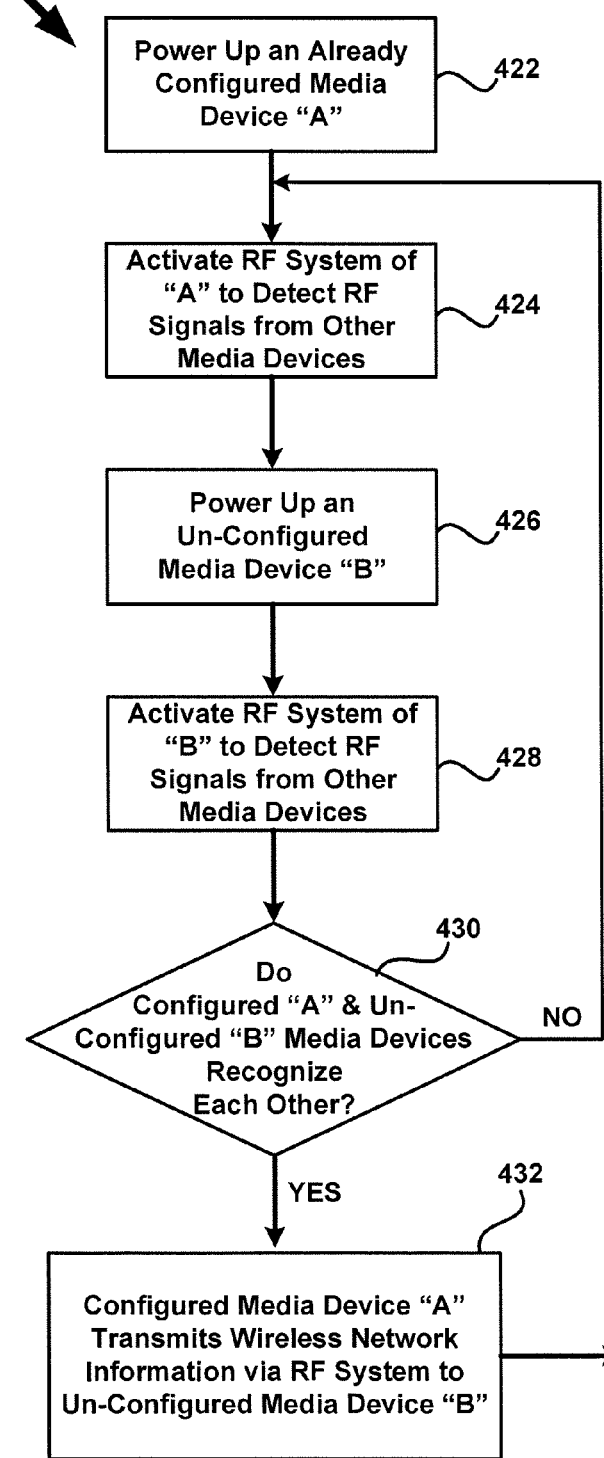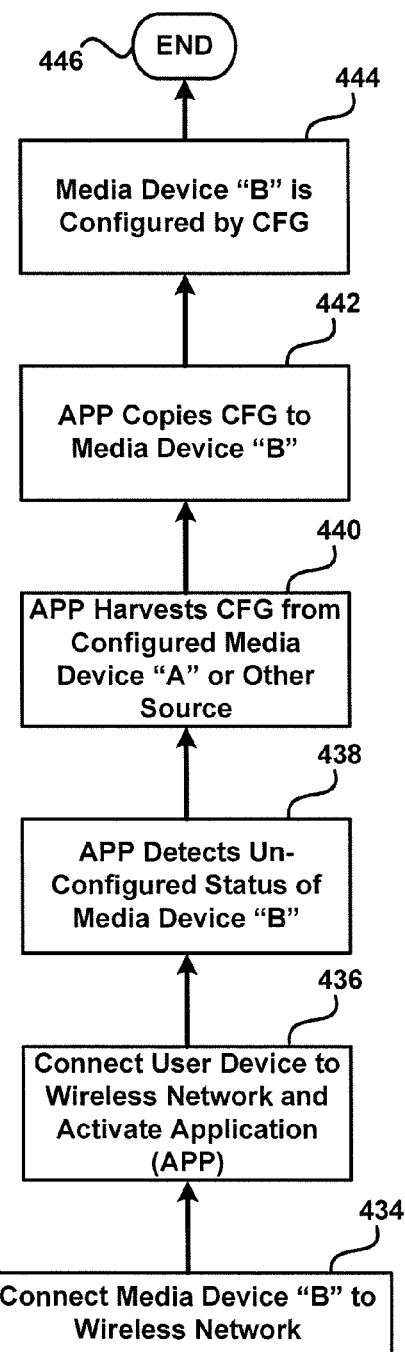
FIG. 4B

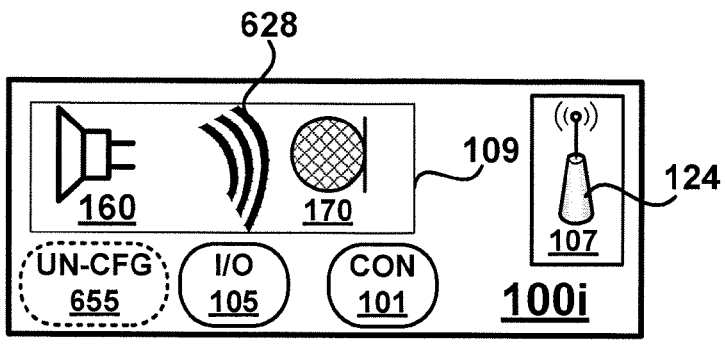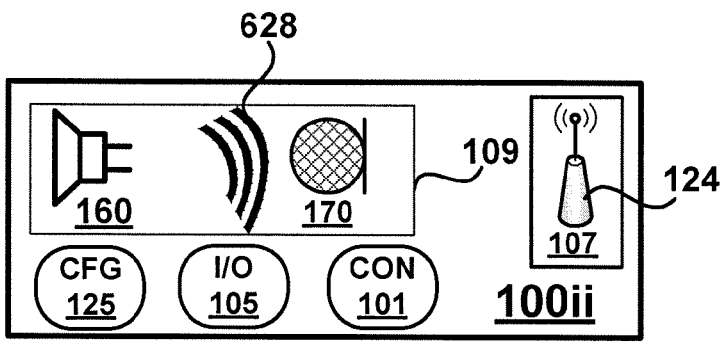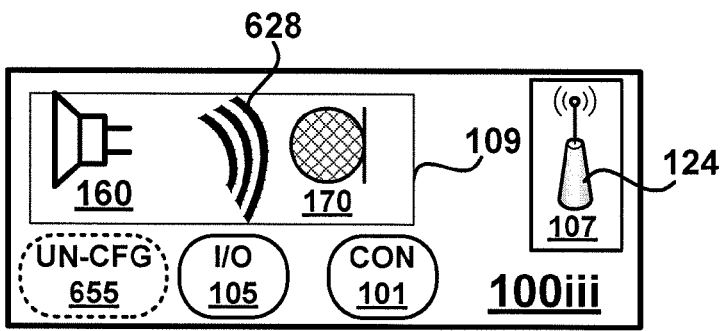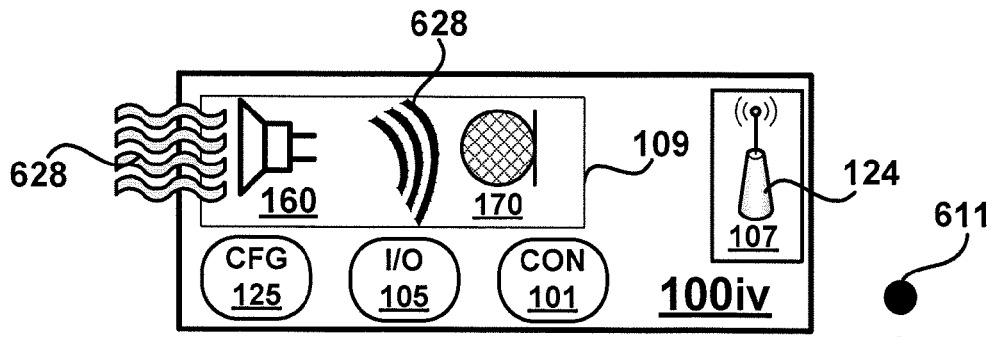
FIG. 6B

MEDIA DEVICE CONFIGURATION AND ECOSYSTEM SETUP

CROSS-REFERENCE TO RELATED APPLICATIONS

This application is related to the following applications: U.S. patent application Ser. No. 13/802,528 filed on Mar. 13, 2013 and titled "Cloud-Based Media Device Configuration And Ecosystem Setup", which is hereby incorporated by reference in its entirety for all purposes.

FIELD

Embodiments of the present application relate generally to electrical and electronic hardware, computer software, wired and wireless network communications, wearable, hand held, and portable computing devices for facilitating communication of information. More specifically, disclosed are an eco-system of wirelessly interconnected media devices that configure and communicate with one another with no or minimal interaction from a user or a user's devices.

BACKGROUND

Conventional paradigms for media devices that wirelessly connect with and communicate with each other and/or a user device (e.g., a tablet or smartphone) typically require the user to configure each media device added to the users system of media devices. For example, Bluetooth® (BT) devices require the user to place a media device in BT pairing mode and a user device in BT discover mode. When the user device detects the BT radio of the media device, the two devices may "pair" with each other. Sometimes, a code must be entered before pairing may occur. After the devices are paired they may wirelessly communicate with each other and depending on the BT protocols, exchange data and control. Typically, when the user adds another BT device, the pairing between the user device and the prior BT device must be broken and the user must pair his/her device with the newly added BT device. For media devices that use other forms of wireless communications, such as WiFi, the process of adding and configuring devices may be more complicated. The user usually has to configure each new media device with information about the wireless network the device will communicate over, such as wireless network name, password, etc. Each wireless device added to the users system may be aware of the wireless network and other entities that are connected with the network; however, many of those devices may not be configured to work well with one another without effort on part of the user to make inter-operability possible.

Ideally, a user ought to be able to configure a first media device easily and with minimal effort on part of the user. Subsequently, as new media devices are added, previously configured media devices recognize newly added media devices and act on behalf of the user to configure the newly added devices. As an ecosystem of the user's media devices continues to grow (e.g., new and or different media devices are added), media devices in that eco-system ideally will wirelessly interact with one another to manage device configuration and manage shifting roles of each device by dynamically re-configuring/re-tasking devices as needed to make one or more devices serve a new roles according to the user's needs.

Thus, there is a need for devices, systems, methods, and software that allow a user to configure (e.g., wirelessly) a first media device and leverage that configuration with future media devices automatically or with minimal user intervention.

BRIEF DESCRIPTION OF THE DRAWINGS

Various embodiments or examples ("examples") of the present application are disclosed in the following detailed description and the accompanying drawings. The drawings are not necessarily to scale:

FIG. 3 depicts one example of a flow diagram of a process for installing an application on a user device and configuring a first media device using the application according to an embodiment of the present application;

FIGS. 4A and 4B depict example flow diagrams for processes for configuring an un-configured media device according to embodiments of the present application;

FIGS. 6A through 6C depict block diagrams of a plurality of media devices wirelessly communicating using acoustic transducers to transmit and receive data respectively according to an embodiment of the present application;

DETAILED DESCRIPTION

Various embodiments or examples may be implemented in numerous ways, including as a system, a process, a method, an apparatus, a user interface, or a series of program instructions on a non-transitory computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
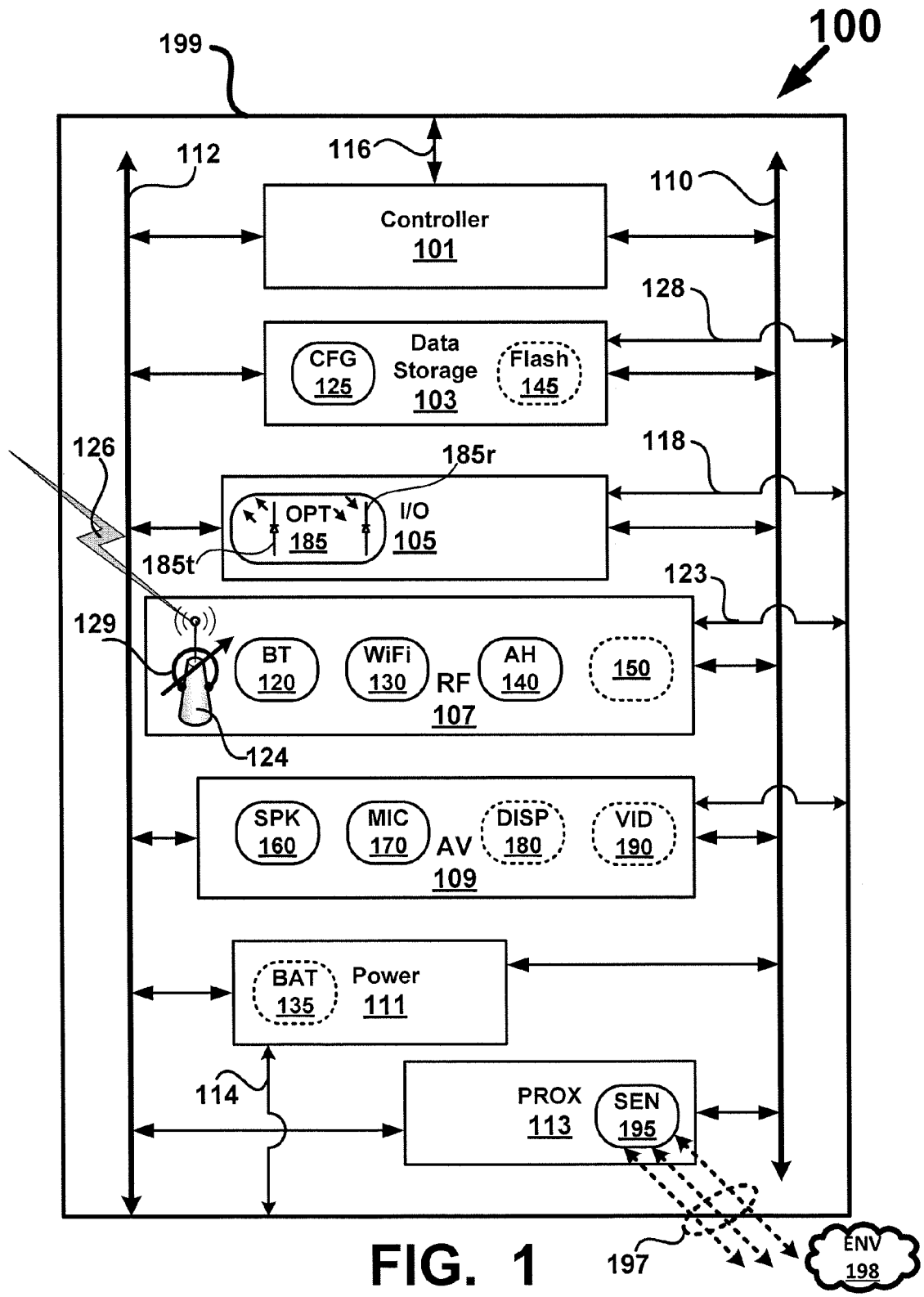
FIG. 1 depicts a block diagram of one example of a media device according to an embodiment of the present application.

FIG. 1 depicts a block diagram of one embodiment of a media device 100 having systems including but not limited to a controller 101, a data storage (DS) system 103, a input/output (I/O) system 105, a radio frequency (RF) system 107, an audio/video (A/V) system 109, a power system 111, and a proximity sensing (PROX) system 113. A bus 110 enables electrical communication between the controller 101, DS system 103, I/O system 105, RF system 107, AV system 109, power system 111, and PROX system 113. Power bus 112 supplies electrical power from power system 111 to the controller 101, DS system 103, I/O system 105, RF system 107, AV system 109, and PROX system 113.

Power system 111 may include a power source internal to the media device 100 such as a battery (e.g., AAA or AA batteries) or a rechargeable battery (e.g., such as a lithium ion or nickel metal hydride type battery, etc.) denoted as BAT 135. Power system 111 may be electrically coupled with a port 114 for connecting an external power source (not shown) such as a power supply that connects with an external AC or DC power source. Examples include but are not limited to a wall wart type of power supply that converts AC power to DC power or AC power to AC power at a different voltage level. In other examples, port 114 may be a connector (e.g., an IEC connector) for a power cord that plugs into an AC outlet or other type of connecter, such as a universal serial bus (USB) connector. Power system 111 provides DC power for the various systems of media device 100. Power system 111 may convert AC or DC power into a form usable by the various systems of media device 100. Power system 111 may provide the same or different voltages to the various systems of media device 100. In applications where a rechargeable battery is used for BAT 135, the external power source may be used to power the power system 111, recharge BAT 135, or both. Further, power system 111 on its own or under control or controller 101 may be configured for power management to reduce power consumption of media device 100, by for example, reducing or disconnecting power from one or more of the systems in media device 100 when those systems are not in use or are placed in a standby or idle mode. Power system 111 may also be configured to monitor power usage of the various systems in media device 100 and to report that usage to other systems in media device 100 and/or to other devices (e.g., including other media devices 100) using one or more of the I/O system 105, RF system 107, and AV system 109, for example. Operation and control of the various functions of power system 111 may be externally controlled by other devices (e.g., including other media devices 100).

Controller 101 controls operation of media device 100 and may include a non-transitory computer readable medium, such as executable program code to enable control and operation of the various systems of media device 100. DS 103 may be used to store executable code used by controller 101 in one or more data storage mediums such as ROM, RAM, SRAM, RAM, SSD, Flash, etc., for example. Controller 101 may include but is not limited to one or more of a microprocessor (μP), a microcontroller (μP), a digital signal processor (DSP), a baseband processor, an application specific integrated circuit (ASIC), just to name a few. Processors used for controller 101 may include a single core or multiple cores (e.g., dual core, quad core, etc.). Port 116 may be used to electrically couple controller 101 to an external device (not shown).

DS system 103 may include but is not limited to non-volatile memory (e.g., Flash memory), SRAM, DRAM, ROM, SSD, just to name a few. In that the media device 100 in some applications is designed to be compact, portable, or to have a small size footprint, memory in DS 103 will typically be solid state memory (e.g., no moving or rotating components); however, in some application a hard disk drive (HDD) or hybrid HDD may be used for all or some of the memory in DS 103. In some examples, DS 103 may be electrically coupled with a port 128 for connecting an external memory source (e.g., USB Flash drive, SD, SDHC, SDXC, microSD, Memory Stick, CF, SSD, etc.). Port 128 may be a USB or mini USB port for a Flash drive or a card slot for a Flash memory card. In some examples as will be explained in greater detail below, DS 103 includes data storage for configuration data, denoted as CFG 125, used by controller 101 to control operation of media device 100 and its various systems. DS 103 may include memory designate for use by other systems in media device 100 (e.g., MAC addresses for WiFi 130, network passwords, data for settings and parameters for A/V 109, and other data for operation and/or control of media device 100, etc.). DS 103 may also store data used as an operating system (OS) for controller 101. If controller 101 includes a DSP, then DS 103 may store data, algorithms, program code, an OS, etc. for use by the DSP, for example. In some examples, one or more systems in media device 100 may include their own data storage systems.

I/O system 105 may be used to control input and output operations between the various systems of media device 100 via bus 110 and between systems external to media device 100 via port 118. Port 118 may be a connector (e.g., USB, HDMI, Ethernet, fiber optic, Toslink, Firewire, IEEE 1394, or other) or a hard wired (e.g., captive) connection that facilitates coupling I/O system 105 with external systems. In some examples port 118 may include one or more switches, buttons, or the like, used to control functions of the media device 100 such as a power switch, a standby power mode switch, a button for wireless pairing, an audio muting button, an audio volume control, an audio mute button, a button for connecting/disconnecting from a WiFi network, an infrared (IR) transceiver, just to name a few. I/O system 105 may also control indicator lights, audible signals, or the like (not shown) that give status information about the media device 100, such as a light to indicate the media device 100 is powered up, a light to indicate the media device 100 is in wireless communication (e.g., WiFi, Bluetooth®, WiMAX, cellular, etc.), a light to indicate the media device 100 is Bluetooth® paired, in Bluetooth® pairing mode, Bluetooth® communication is enabled, a light to indicate the audio and/or microphone is muted, just to name a few. Audible signals may be generated by the I/O system 105 or via the AV system 107 to indicate status, etc. of the media device 100. Audible signals may be used to announce Bluetooth® status, powering up or down the media device 100, muting the audio or microphone, an incoming phone call, a new message such as a text, email, or SMS, just to name a few. In some examples, I/O system 105 may use optical technology to wirelessly communicate with other media devices 100 or other devices. Examples include but are not limited to infrared (IR) transmitters, receivers, transceivers, an IR LED, and an IR detector, just to name a few. I/O system 105 may include an optical transceiver OPT 185 that includes an optical transmitter 185$t$ (e.g., an IR LED) and an optical receiver 185$r$ (e.g., a photo diode). OPT 185 may include the circuitry necessary to drive the optical transmitter 185*t* with encoded signals and to receive and decode signals received by the optical receiver 185*r*. Bus 110 may be used to communicate signals to and from OPT 185. OPT 185 may be used to transmit and receive IR commands consistent with those used by infrared remote controls used to control AV equipment, televisions, computers, and other types of systems and consumer electronics devices. The IR commands may be used to control and configure the media device 100, or the media device 100 may use the IR commands to configure/re-configure and control other media devices or other user devices, for example.

RF system 107 includes at least one RF antenna 124 that is electrically coupled with a plurality of radios (e.g., RF transceivers) including but not limited to a Bluetooth® (BT) transceiver 120, a WiFi transceiver 130 (e.g., for wireless communications over a wireless and/or WiMAX network), and a proprietary Ad Hoc (AH) transceiver 140 pre-configured (e.g., at the factory) to wirelessly communicate with a proprietary Ad Hoc wireless network (AH-WiFi) (not shown). AH 140 and AH-WiFi are configured to allow wireless communications between similarly configured media devices (e.g., an eco-system comprised of a plurality of similarly configured media devices) as will be explained in greater detail below. RF system 107 may include more or fewer radios than depicted in FIG. 1 and the number and type of radios will be application dependent. Furthermore, radios in RF system 107 need not be transceivers, RF system 107 may include radios that transmit only or receive only, for example. Optionally, RF system 107 may include a radio 150 configured for RF communications using a proprietary format, frequency band, or other existent now or to be implemented in the future. Radio 150 may be used for cellular communications (e.g., 3G, 4G, or other), for example. Antenna 124 may be configured to be a de-tunable antenna such that it may be de-tuned 129 over a wide range of RF frequencies including but not limited to licensed bands, unlicensed bands, WiFi, WiMAX, cellular bands, Bluetooth®, from about 2.0 GHz to about 6.0 GHz range, and broadband, just to name a few. As will be discussed below, PROX system 113 may use the de-tuning 129 capabilities of antenna 124 to sense proximity of the user, other people, the relative locations of other media devices 100, just to name a few. Radio 150 (e.g., a transceiver) or other transceiver in RF 107, may be used in conjunction with the de-tuning capabilities of antenna 124 to sense proximity, to detect and or spatially locate other RF sources such as those from other media devices 100, devices of a user, just to name a few. RF system 107 may include a port 123 configured to connect the RF system 107 with an external component or system, such as an external RF antenna, for example. The transceivers depicted in FIG. 1 are non-limiting examples of the type of transceivers that may be included in RF system 107. RF system 107 may include a first transceiver configured to wirelessly communicate using a first protocol, a second transceiver configured to wirelessly communicate using a second protocol, a third transceiver configured to wirelessly communicate using a third protocol, and so on. One of the transceivers in RF system 107 may be configured for short range RF communications, such as within a range from about 1 meter to about 15 meters, or less, for example. Another one of the transceivers in RF system 107 may be configured for long range RF communications, such any range up to about 50 meters or more, for example. Short range RF may include Bluetooth®; whereas, long range RF may include WiFi, WiMAX, cellular, and Ad Hoc wireless, for example.

AV system 109 includes at least one audio transducer, such as a loud speaker 160, a microphone 170, or both. AV system 109 further includes circuitry such as amplifiers, preamplifiers, or the like as necessary to drive or process signals to/from the audio transducers. Optionally, AV system 109 may include a display (DISP) 180, video device (VID) 190 (e.g., an image captured device or a web CAM, etc.), or both. DISP 180 may be a display and/or touch screen (e.g., a LCD, OLED, or flat panel display) for displaying video media, information relating to operation of media device 100, content available to or operated on by the media device 100, playlists for media, date and/or time of day, alpha-numeric text and characters, caller ID, file/directory information, a GUI, just to name a few. A port 122 may be used to electrically couple AV system 109 with an external device and/or external signals. Port 122 may be a USB, HDMI, Firewire/IEEE-1394, 3.5 mm audio jack, or other. For example, port 122 may be a 3.5 mm audio jack for connecting an external speaker, headphones, earphones, etc. for listening to audio content being processed by media device 100. As another example, port 122 may be a 3.5 mm audio jack for connecting an external microphone or the audio output from an external device. In some examples, SPK 160 may include but is not limited to one or more active or passive audio transducers such as woofers, concentric drivers, tweeters, super tweeters, midrange drivers, sub-woofers, passive radiators, just to name a few. MIC 170 may include one or more microphones and the one or more microphones may have any polar pattern suitable for the intended application including but not limited to omni-directional, directional, bi-directional, uni-directional, bi-polar, uni-polar, any variety of cardioid pattern, and shotgun, for example. MIC 170 may be configured for mono, stereo, or other. MIC 170 may be configured to be responsive (e.g., generate an electrical signal in response to sound) to any frequency range including but not limited to ultrasonic, infrasonic, from about 20 Hz to about 20 kHz, and any range within or outside of human hearing. In some applications, the audio transducer of AV system 109 may serve dual roles as both a speaker and a microphone.

Circuitry in AV system 109 may include but is not limited to a digital-to-analog converter (DAC) and algorithms for decoding and playback of media files such as MP3, FLAC, AIFF, ALAC, WAV, MPEG, QuickTime, AVI, compressed media files, uncompressed media files, and lossless media files, just to name a few, for example. A DAC may be used by AV system 109 to decode wireless data from a user device or from any of the radios in RF system 107. AV system 109 may also include an analog-to-digital converter (ADC) for converting analog signals, from MIC 170 for example, into digital signals for processing by one or more system in media device 100.

Media device 100 may be used for a variety of applications including but not limited to wirelessly communicating with other wireless devices, other media devices 100, wireless networks, and the like for playback of media (e.g., streaming content), such as audio, for example. The actual source for the media need not be located on a user's device (e.g., smart phone, MP3 player, iPod, iPhone, iPad, Android, laptop, PC, etc.). For example, media files to be played back on media device 100 may be located on the Internet, a web site, or in the cloud, and media device 100 may access (e.g., over a WiFi network via WiFi 130) the files, process data in the files, and initiate playback of the media files. Media device 100 may access or store in its memory a playlist or favorites list and playback content listed in those lists. In some applications, media device 100 will store content (e.g., files) to be played back on the media device 100 or on another media device 100.

Media device 100 may include a housing, a chassis, an enclosure or the like, denoted in FIG. 1 as 199. The actual shape, configuration, dimensions, materials, features, design, ornamentation, aesthetics, and the like of housing 199 will be application dependent and a matter of design choice. Therefore, housing 199 need not have the rectangular form depicted in FIG. 1 or the shape, configuration etc., depicted in the Drawings of the present application. Nothing precludes housing 199 from comprising one or more structural elements, that is, the housing 199 may be comprised of several housings that form media device 100. Housing 199 may be configured to be worn, mounted, or otherwise connected to or carried by a human being. For example, housing 199 may be configured as a wristband, an earpiece, a headband, a headphone, a headset, an earphone, a hand held device, a portable device, a desktop device, just to name a few.

In other examples, housing 199 may be configured as speaker, a subwoofer, a conference call speaker, an intercom, a media playback device, just to name a few. If configured as a speaker, then the housing 199 may be configured as a variety of speaker types including but not limited to a left channel speaker, a right channel speaker, a center channel speaker, a left rear channel speaker, a right rear channel speaker, a subwoofer, a left channel surround speaker, a right channel surround speaker, a left channel height speaker, a right channel height speaker, any speaker in a 3.1, 5.1, 7.1, 9.1 or other surround sound format including those having two or more subwoofers or having two or more center channels, for example. In other examples, housing 199 may be configured to include a display (e.g., DISP 180) for viewing video, serving as a touch screen interface for a user, providing an interface for a GUI, for example.

PROX system 113 may include one or more sensors denoted as SEN 195 that are configured to sense 197 an environment 198 external to the housing 199 of media device 100. Using SEN 195 and/or other systems in media device 100 (e.g., antenna 124, SPK 160, MIC 170, etc.), PROX system 113 senses 197 an environment 198 that is external to the media device 100 (e.g., external to housing 199). PROX system 113 may be used to sense one or more of proximity of the user or other persons to the media device 100 or other media devices 100. PROX system 113 may use a variety of sensor technologies for SEN 195 including but not limited to ultrasound, infrared (IR), passive infrared (PIR), optical, acoustic, vibration, light, ambient light sensor (ALS), IR proximity sensors, LED emitters and detectors, RGB LED's, RF, temperature, capacitive, capacitive touch, inductive, just to name a few. PROX system 113 may be configured to sense location of users or other persons, user devices, and other media devices 100, without limitation. Output signals from PROX system 113 may be used to configure media device 100 or other media devices 100, to re-configure and/or re-purpose media device 100 or other media devices 100 (e.g., change a role the media device 100 plays for the user, based on a user profile or configuration data), just to name a few. A plurality of media devices 100 in an eco-system of media devices 100 may collectively use their respective PROX system 113 and/or other systems (e.g., RF 107, de-tunable antenna 124, AV 109, etc.) to accomplish tasks including but not limited to changing configuration, re-configuring one or more media devices, implement user specified configurations and/or profiles, insertion and/or removal of one or more media devices in an eco-system, just to name a few.

Simple Out-of-the-Box User Experience

Figure 2A:
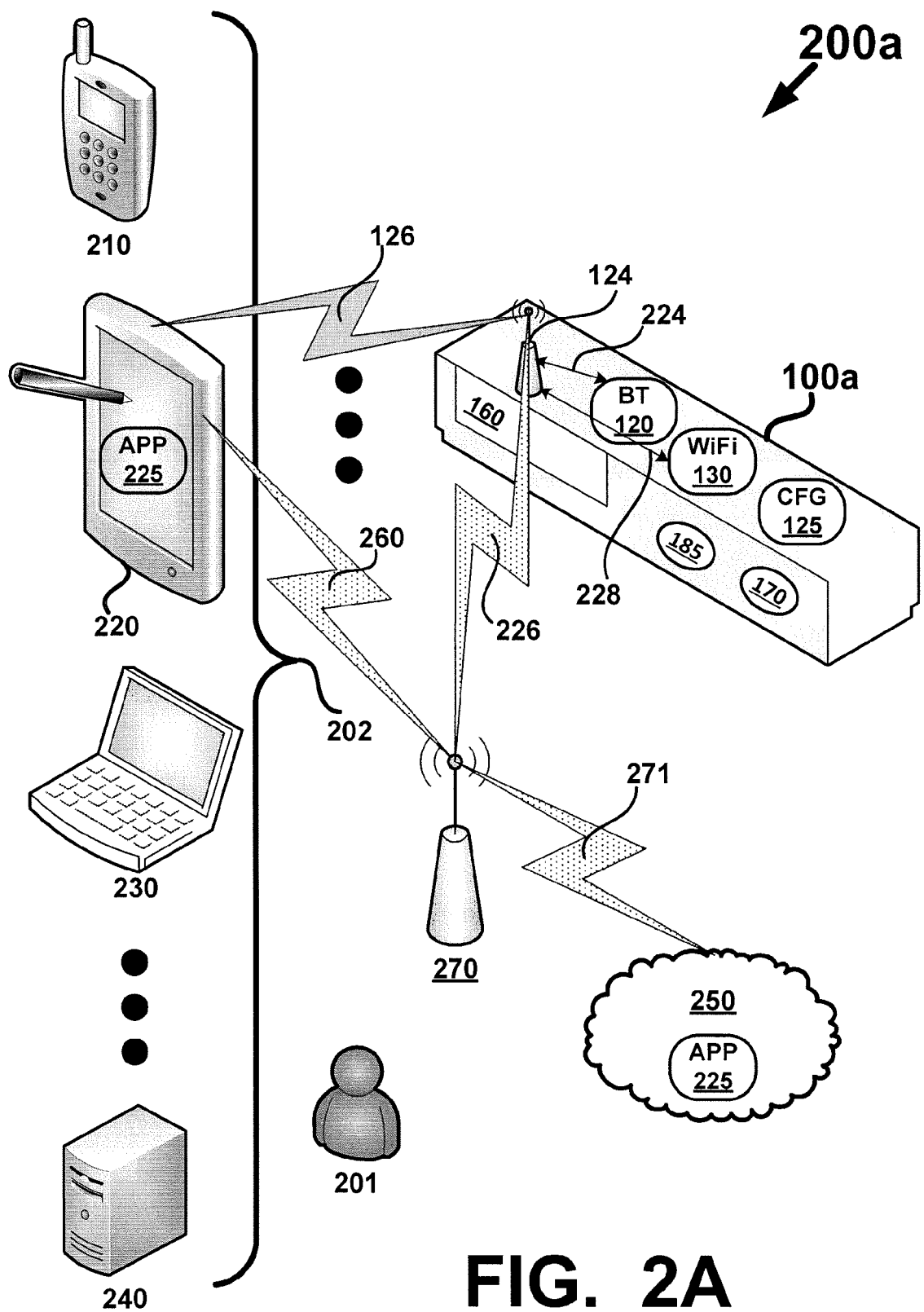
FIG. 2A depicts one example of a configuration scenario for a user device and a media device according to an embodiment of the present application.

Attention is now directed to FIG. 2A, where a scenario 200a depicts one example of a media device (e.g., media device 100 of FIG. 1 or a similarly provisioned media device) being configured for the first time by a user 201. For purposes of explanation, in FIG. 2A media device is denoted as 100a to illustrate that it is the first time the media device 100a is being configured. For example, the first configuration of media device 100a may be after it is purchased, acquired, borrowed, or otherwise by user 201, that is, the first time may be the initial out-of-the-box configuration of media device 100a when it is new. Scenario 200a depicts a desirable user experience for user 201 to achieve the objective of making the configuring of media device 100a as easy, straight forward, and fast as possible.

To that end, in FIG. 2A, scenario 200a may include media device 100a to be configured, for example, initially by user 201 using a variety of devices 202 including but not limited to a smartphone 210, a tablet 220, a laptop computer 230, a desktop PC or server 240, . . . etc. For purposes of simplifying explanation, the following description will focus on tablet 220, although the description may apply to any of the other devices 202 as well. Upon initial power up of media device 100a, controller 101 may command RF system 107 to electrically couple 224, transceiver BT 120 with antenna 124, and command BT 120 to begin listening 126 for a BT pairing signal from device 220. Here, user 201 as part of the initialization process may have already used a Bluetooth® menu on tablet 220 to activate the BT radio and associated software in tablet 220 to begin searching (e.g., via RF) for a BT device to pair with. Pairing may require a code (e.g., a PIN number or code) be entered by the user 201 for the device being paired with, and the user 201 may enter a specific code or a default code such as "0000", for example.

Subsequently, after tablet 220 and media device 100a have successfully BT paired with one another, the process of configuring media device 100a to service the specific needs of user 201 may begin. In some examples, after successful BT pairing, BT 120 need not be used for wireless communication between media device 100a and the user's device (e.g., tablet 220 or other). Controller 101, after a successful BT pairing, may command RF system 107 to electrically couple 228, WiFi 130 with antenna 124 and wireless communications between tablet 220 and media device 100a (see 260, 226) may occur over a wireless network (e.g., WiFi or WiMAX) or other as denoted by wireless access point 270. Post-pairing, tablet 220 requires a non-transitory computer readable medium that includes data and/or executable code to form a configuration (CFG) 125 for media device 100a. For purposes of explanation, the non-transitory computer readable medium will be denoted as an application (APP) 225. APP 225 resides on or is otherwise accessible by tablet 220 or media device 100a. User 201 uses APP 225 (e.g., through a GUI, menu, drop down boxes, or the like) to make selections that comprise the data and/or executable code in the CFG 125.

APP 225 may be obtained by tablet 220 in a variety of ways. In one example, the media device 100a includes instructions (e.g., on its packaging or in a user manual) for a website on the Internet 250 where the APP 225 may be downloaded. Tablet 220 may use its WiFi or Cellular RF systems to communicate with wireless access point 270 (e.g., a cell tower or wireless router) to connect 271 with the website and download APP 255 which is stored on tablet 220 as APP 225. In another example, tablet 220 may scan or otherwise image a bar code or TAG operative to connect the tablet 220 with a location (e.g., on the Internet 250) where the APP 225 may be found and downloaded. Tablet 220 may have access to an applications store such as Google Play for Android devices, the Apple App Store for iOS devices, or the Windows 8 App Store for Windows 8 devices. The APP 225 may then be downloaded from the app store. In yet another example, after pairing, media device 100*a* may be preconfigured to either provide (e.g., over the BT 120 or WiFi 130) an address or other location that is communicated to tablet 220 and the tablet 220 uses the information to locate and download the APP 225. In another example, media device 100*a* may be preloaded with one or more versions of APP 225 for use in different device operating systems (OS), such as one version for Android, another for iOS, and yet another for Windows 8, etc. In that OS versions and/or APP 225 are periodically updated, media device 100*a* may use its wireless systems (e.g., BT 120 or WiFi 130) to determine if the preloaded versions are out of date and need to be replaced with newer versions, which the media device 100*a* obtains, downloads, and subsequently makes available for download to tablet 220.

Regardless of how the APP 225 is obtained, once the APP 225 is installed on any of the devices 202, the user 201 may use the APP 225 to select various options, commands, settings, etc. for CFG 125 according to the user's preferences, needs, media device ecosystem, etc., for example. After the user 201 finalizes the configuration process, CFG 125 is downloaded (e.g., using BT 120 or WiFi 130) into DS system 103 in media device 100*a*. Controller 101 may use the CFG 125 and/or other executable code to control operation of media device 100*a*. In FIG. 2A, the source for APP 225 may be obtained from a variety of locations including but not limited to: the Internet 250; a file or the like stored in the Cloud; a web site; a server farm; a FTP site; a drop box; an app store; a manufactures web site; or the like, just to name a few. APP 225 may be installed using other processes including but not limited to: dragging and dropping the appropriate file into a directory, folder, desktop or the like on tablet 220; emailing the APP 225 as an attachment, a compressed or ZIP file; cutting and pasting the App 225, just to name a few.

CFG 125 may include data such as the name and password for a wireless network (e.g., 270) so that WiFi 130 may connect with (see 226) and use the wireless network for future wireless communications, data for configuring subsequently purchased devices 100, data to access media for playback, just to name a few. By using the APP 225, user 201 may update CFG 125 as the needs of the user 201 change over time, that is, APP 225 may be used to re-configure an existing CFG 125. Furthermore, APP 225 may be configured to check for updates and to query the user 201 to accept the updates such that if an update is accepted an updated version of the APP 225 may be installed on tablet 220 or on any of the other devices 202. Although the previous discussion has focused on installing the APP 225 and CFG 125, one skilled in the art will appreciate that other data may be installed on devices 202 and/or media device 100*a* using the process described above. As one example, APP 225 or some other program may be used to perform software, firmware, or data updates on device 100*a*. DS system 103 on device 100*a* may include storage set aside for executable code (e.g., an operating system) and data used by controller 101 and/or the other systems depicted in FIG. 1.

Figure 2B:
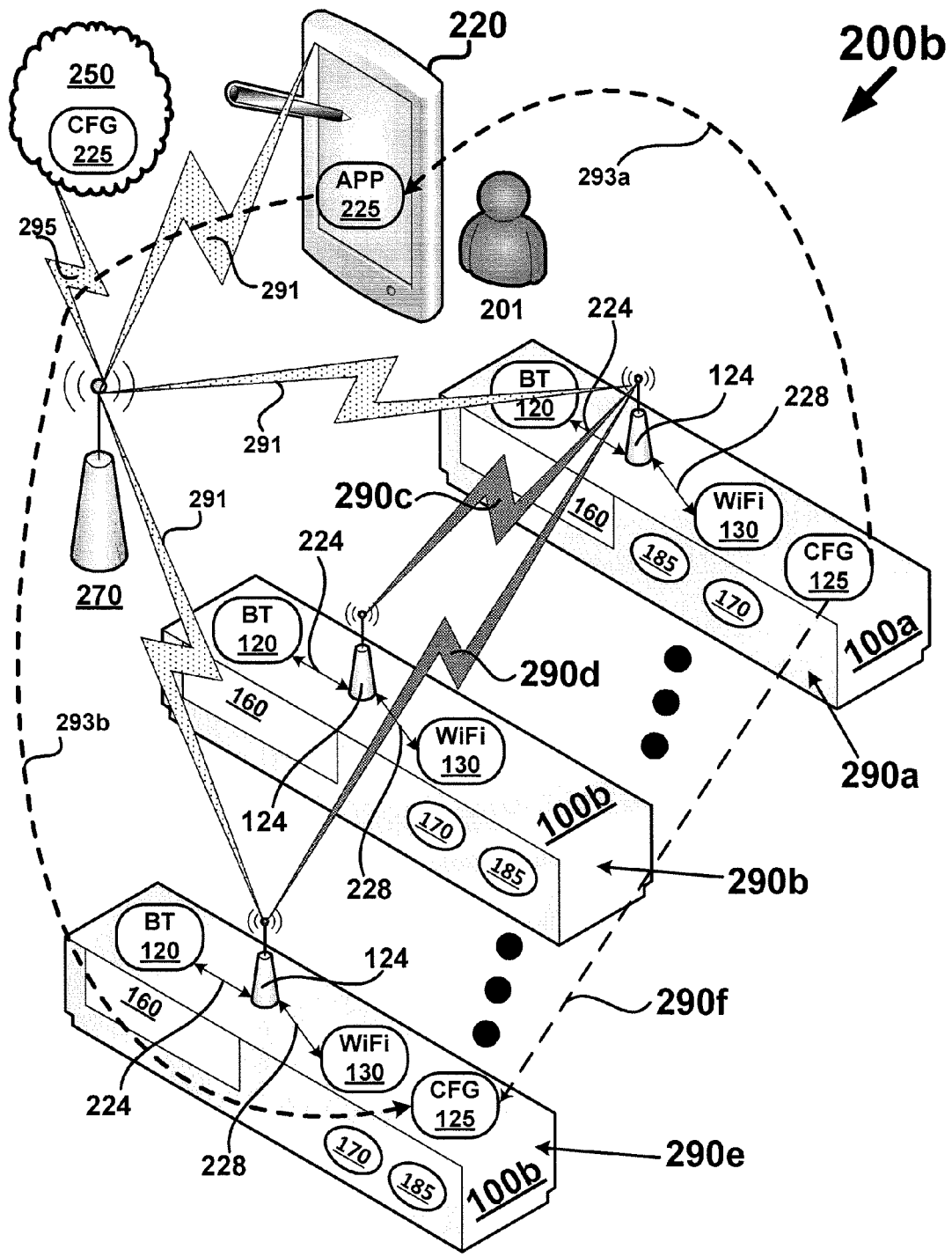
FIG. 2B depicts example scenarios for another media device being configured using a configuration from a previously configured media device according to an embodiment of the present application.

Moving on to FIG. 2B, where a several example scenarios of how a previously configured media device 100*a* that includes CFG 125 may be used to configure another media device 100*b* that is initially un-configured. In scenario 200*b*, media device 100*a* is already powered up or is tuned on (e.g., by user 201) or is otherwise activated such that its RF system 107 is operational. Accordingly, at stage 290*a*, media device 100*a* is powered up and configured to detect RF signatures from other powered up media devices using its RF system 107. At stage 290*b* another media device denoted as 100*b* is introduced into RF proximity of media device 100*a* and is powered up so that its RF system 107 is operational and configured to detect RF signatures from other powered up media devices (e.g., signature of media device 100*a*). Here RF proximity broadly means within adequate signal strength range of the BT transceivers 120, WiFi transceivers 130, or any other transceivers in RF system 107, RF systems in the users devices (e.g., 202, 220), and other wireless devices such as wireless routers, WiFi networks (e.g., 270), WiMAX networks, and cellular networks, for example. Adequate signal strength range is any range that allows for reliable RF communications between wireless devices. For BT enabled devices, adequate signal strength range may be determined by the BT specification, but is subject to change as the BT specification and technology evolve. For example, adequate signal strength range for BT 120 may be approximately 10 meters (e.g., ~30 feet). For WiFi 130, adequate signal strength range may vary based on parameters such as distance from and signal strength of the wireless network, and structures that interfere with the WiFi signal. However, in most typical wireless systems adequate signal strength range is usually greater than 10 meters.

At stage 290*b*, media device 100*b* is powered up and at stage 290*c* its BT 120 and the BT 120 of media device 100*a* recognize each other. For example, each media device (100*a*, 100*b*) may be pre-configured (e.g., at the factory) to broadcast a unique RF signature or other wireless signature (e.g., acoustic) at power up and/or when it detects the unique signature of another device. The unique RF signature may include status information including but not limited to the configuration state of a media device. Each BT 120 may be configured to allow communications with and control by another media device based on the information in the unique RF signature. Accordingly, at the stage 290*c*, media device 100*b* transmits RF information that includes data that informs other listening BT 120's (e.g., BT 120 in 100*a*) that media device 100*b* is un-configured (e.g., has no CFG 125).

At stage 290*d*, media devices 100*a* and 100*b* negotiate the necessary protocols and/or handshakes that allow media device 100*a* to gain access to DS 103 of media device 100*b*. At stage 290*e*, media device 100*b* is ready to receive CFG 125 from media device 100*a*, and at stage 290*f* the CFG 125 from media device 100*a* is transmitted to media device 100*b* and is replicated (e.g., copied, written, etc.) in the DS 103 of media device 100*b*, such that media device 100*b* becomes a configured media device.

Data in CFG 125 may include information on wireless network 270, including but not limited to wireless network name, wireless password, MAC addresses of other media devices, media specific configuration such as speaker type (e.g., left, right, center channel), audio mute, microphone mute, etc. Some configuration data may be subservient to other data or dominant to other data. After the stage 290*f*, media device 100*a*, media device 100*b*, and user device 220 may wirelessly communicate 291 with one another over wireless network 270 using the WiFi systems of user device 220 and WiFi 130 of media devices 100*a* and 100*b*.

APP 225 may be used to input the above data into CFG 125, for example using a GUI included with the APP 225. User 201 enters data and makes menu selections (e.g., on a touch screen display) that will become part of the data for the CFG 125. APP 225 may also be used to update and/or re-configure an existing CFG 125 on a configured media device. Subsequent to the update and/or re-configuring, other configured or un-configured media devices in the user's ecosystem may be updated and/or re-configured by a previously updated and/or re-configured media device as described herein, thereby relieving the user 201 from having to perform the update and/or re-configure on several media devices. The APP 225 or a location provided by the APP 225 may be used to specify playlists, media sources, file locations, and the like. APP 225 may be installed on more than one user device 202 and changes to APP 225 on one user device may later by replicated on the APP 225 on other user devices by a synching or update process, for example. APP 225 may be stored on the internet or in the cloud and any changes to APP 225 may be implemented in versions of the APP 225 on various user devices 202 by merely activating the APP 225 on that device and the APP 225 initiates a query process to see if any updates to the APP are available, and if so, then the APP 225 updates itself to make the version on the user device current with the latest version.

Media devices 100a and 100b having their respective WiFi 130 enabled to communicate with wireless network 270, tablet 220, or other wireless devices of user 201. FIG. 2B includes an alternate scenario 200b that may be used to configure a newly added media device, that is, an un-configured media device (e.g., 100b). For example, at stage 290d, media device 100a, which is assumed to already have its WiFi 130 configured for communications with wireless network 270, transmits over its BT 120 the necessary information for media device 100b to join wireless network 270. After stage 290d, media device 100b, media device 100a, and tablet 220 are connected 291 to wireless network 270 and may communicate wirelessly with one another via network 270. Furthermore, at stage 290d, media device 100b is still in an un-configured state. Next, at stage 290e, APP 225 is active on tablet 220 and wirelessly accesses the status of media devices 100a and 100b. APP 225 determines that media device 100b is un-configured and APP 225 acts to configure 100b by harvesting CFG 125 (e.g., getting a copy of) from configured media device 100a by wirelessly 293a obtaining CFG 125 from media device 100a and wirelessly 293b transmitting the harvested CFG 125 to media device 100b. Media device 100b uses its copy of CFG 125 to configure itself thereby placing it in a configured state.

After all the devices 220, 100a, 100b, are enabled for wireless communications with one another, FIG. 2B depicts yet another example scenario where after stage 290d, the APP 225 or any one of the media devices 100a, 100b, may access 295 the CFG 125 for media device 100b from an external location, such as the Internet, the cloud, etc. as denoted by 250 where a copy of CFG 125 may be located and accessed for download into media device 100b. APP 255, media device 100b, or media device 100a, may access the copy of CFG 125 from 250 and wirelessly install it on media device 100b.

In the example scenarios depicted in FIG. 2B, it should be noted that after the pairing of media device 100a and tablet 220 in FIG. 2A, the configuration of media device 100b in FIG. 2B did not require tablet 220 to use its BT features to pair with media device 100b to effectuate the configuration of media device 100b. Moreover, there was no need for the BT pairing between tablet 220 and media device 100a to be broken in order to effectuate the configuration of media device 100b. Furthermore, there is no need for table 220 and media devices 100a and/or 100b to be BT paired at all with tablet 220 in order to configure media device 100b. Accordingly, from the standpoint of user 201, adding a new media device to his/her ecosystem of similarly provisioned media devices does not require un-pairing with one or more already configured devices and then pairing with the new device to be added to the eco-system. Instead, one of the already configured devices (e.g., media device 100a having CFG 125 installed) may negotiate with the APP 225 and/or the new device to be added to handle the configuration of the new device (e.g., device 100b). Similarly provisioned media devices broadly means devices including some, all, or more of the systems depicted in FIG. 1 and designed (e.g., by the same manufacture or to the same specifications and/or standards) to operate with one another in a seamless manner as media devices are added to or removed from an eco-system.

Reference is now made to FIG. 3 where a flow diagram 300 depicts one example of configuring a first media device using an application installed on a user device as was described above in regards to FIG. 2A. At a stage 302 a Bluetooth® (BT) discovery mode is activated on a user device such as the examples 202 of user devices depicted in FIG. 2A. Typically, a GUI on the user device includes a menu for activating BT discovery mode, after which, the user device waits to pick up a BT signal of a device seeking to pair with the user's device. At a stage 304 a first media device (e.g., 100a) is powered up (if not already powered up). At stage 306 a BT pairing mode is activated on the first media device. Examples of activating BT pairing mode include but are not limited to pushing a button or activating a switch on the first media device that places the first media device in BT pairing mode such that its BT 120 is activated to generate a RF signal that the user's device may discover while in discovery mode. I/O system 105 of media device 100 may receive 118 as a signal the activation of BT pairing mode by actuation of the switch or button and that signal is processed by controller 101 to command RF system 107 to activate BT 120 in pairing mode. In other examples, after powering up the first media device, a display (e.g., DISP 180) may include a touch screen interface and/or GUI that guides a user to activate the BT pairing mode on the first media device.

At a stage 308 the user's device and the first media device negotiate the BT pairing process, and if BT pairing is successful, then the flow continues at stage 310. If BT pairing is not successful, then the flow repeats at the stage 206 until successful BT pairing is achieved. At stage 310 the user device is connected to a wireless network (if not already connected) such as a WiFi, WiMAX, or cellular (e.g., 3G or 4G) network. At a stage 312, the wireless network may be used to install an application (e.g., APP 225) on the user's device. The location of the APP (e.g., on the Internet or in the Cloud) may be provided with the media device or after successful BT pairing, the media device may use its BT 120 to transmit data to the user's device and that data includes a location (e.g., a URI or URL) for downloading or otherwise accessing the APP. At a stage 314, the user uses the APP to select settings for a configuration (e.g., CFG 125) for the first media device. After the user completes the configuration, at a stage 316 the user's device installs the APP on the first media device. The installation may occur in a variety of ways (see FIG. 2A) including but not limited to: using the BT capabilities of each device (e.g., 220 and 100a) to install the CFG; using the WiFi capabilities of each device to install the CFG; and having the first media device (e.g., 100a) fetch the CFG from an external source such as the Internet or Cloud using its WiFi 130; just to name a few. Optionally, at stages 318-324 a determination of whether or not the first media device is connected with a wireless network may be made at a stage 318. If the first media device is already connected with a wireless network the "YES" branch may be taken and the flow may terminate at stage 320. On the other hand, if the first media device is not connected with a wireless network the "NO" branch may be taken and the flow continues at a stage 322 where data in the CFG is used to connect WiFi 130 with a wireless network and the flow may terminate at a stage 324. The CFG may contain the information necessary for a successful connection between WiFi 130 and the wireless network, such as wireless network name and wireless network password, etc.

Figure 4A:
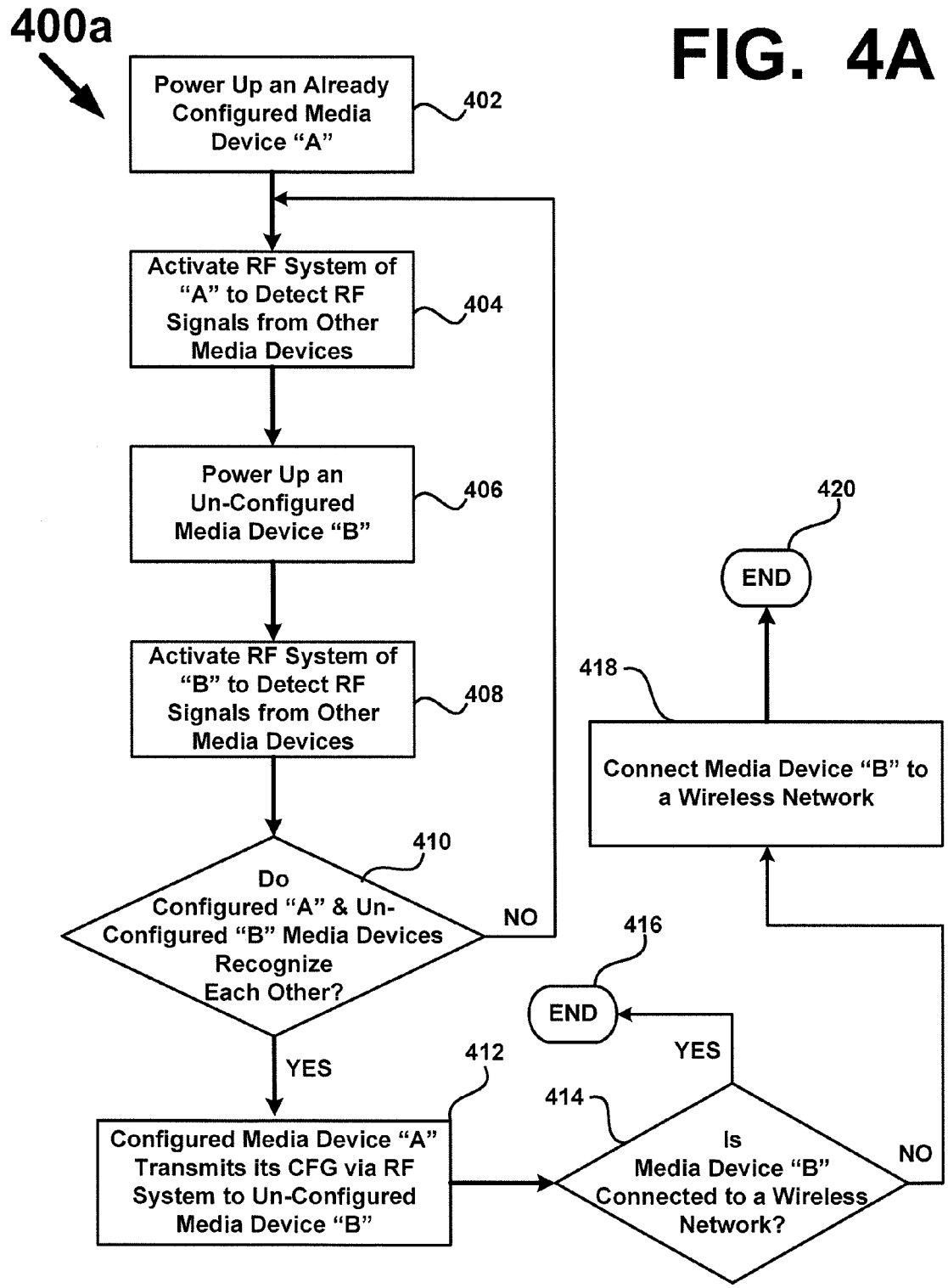

Now reference is made to FIG. 4A, where a flow diagram 400a depicts one example of a process for configuring an un-configured media device "B" (e.g., un-configured media device 100b at stage 290b of FIG. 2B) using a configured media device "A" (e.g., media device 100a having CFG 125 of FIG. 2B). At a stage 402 an already configured media device "A" is powered up. At a stage 404 the RF system (e.g., RF system 107 of FIG. 1) of configured media device "A" is activated. The RF system is configured to detect RF signals from other "powered up" media devices. At a stage 406, an un-configured media device "B" (e.g., un-configured media device 100b at stage 290b of FIG. 2B) is powered up. At a stage 408 the RF system of un-configured media device "B" is activated. At stage 408, the respective RF systems of the configured "A" and un-configured "B" media devices are configured to recognize each other (e.g., via their respective BT 120 transceivers or another transceiver in the RF system). At a stage 410, if the configured "A" and un-configured "B" media devices recognize each other, then a "YES" branch is taken to a stage 412 where the configured media device "A" transmits its configuration (e.g., CFG 125) to the un-configured media device "B" (e.g., see stages 290e and 290f in FIG. 2B). If the configured "A" and un-configured "B" media devices do not recognize each other, then a "NO" branch is taken and the flow may return to an earlier stage (e.g., stage 404 to retry the recognition process. Optionally, after being configured, media device "B" may be connected with a wireless network (e.g., via WiFi 130). At a stage 414 a determination is made as to whether or not media device "B" is connected to a wireless network. If already connected, then a "YES" branch is taken and the process may terminate at a stage 416. However, if not connected with a wireless network, then a "NO" branch is taken and media device "B" is connected to the wireless network at a stage 418. For example, the CFG 125 that was copied to media device "B" may include information such as wireless network name and password and WiFi 130 is configured to effectuate the connection with the wireless network based on that information. Alternatively, media device "A" may transmit the necessary information to media device "B" (e.g., using BT 120) at any stage of flow 400a, such as at the stage 408, for example. After the wireless network connection is made, the flow may terminate at a stage 420.

Attention is now directed to FIG. 4B, where a flow diagram 400b depicts another example of a process for configuring an un-configured media device "B" (e.g., un-configured media device 100b at stage 290b of FIG. 2B) using a configured media device "A" (e.g., media device 100a having CFG 125 of FIG. 2B). At a stage 422 an already configured media device "A" is powered up. At a stage 424 the RF system of configured media device "A" is activated (e.g., RF system 107 of FIG. 1). The RF system is configured to detect RF signals from other "powered up" media devices. At a stage 426, an un-configured media device "B" (e.g., un-configured media device 100b at stage 290b of FIG. 2B) is powered up. At a stage 428 the RF system of un-configured media device "b" is activated (e.g., RF system 107 of FIG. 1). At the stage 428, the respective RF systems of the configured "A" and un-configured "B" media devices are configured to recognize each other (e.g., via their respective BT 120 transceivers or another transceiver in the RF system). At a stage 430, if the configured "A" and un-configured "B" media devices recognize each other, then a "YES" branch is taken to a stage 432 where the configured media device "A" transmits information for a wireless network to the un-configured media device "B" (e.g., see stage 290b in FIG. 2B) and that information is used by the un-configured media device "B" to connect with a wireless network as was described above in regards to FIGS. 2B and 4A. If the configured "A" and un-configured "B" media devices do not recognize each other, then a "NO" branch is taken and the flow may return to an earlier stage (e.g., stage 424 to retry the recognition process. At a stage 434, the information for the wireless network is used by the un-configured media device "B" to effectuate a connection to the wireless network. At a stage 436, a user device is connected with the wireless network and an application (APP) running on the user device (e.g., APP 225 in FIG. 2B) is activated. Stage 436 may be skipped if the user device is already connected to the wireless network. The APP is aware of un-configured media device "B" presence on the wireless network and at a stage 438 detects that media device "B" is presently in an un-configured state and therefore has a status of "un-configured." Un-configured media device "B" may include registers, circuitry, data, program code, memory addresses, or the like that may be used to determine that the media device is un-configured. The un-configured status of media device "B" may be wirelessly broadcast using any of its wireless resources or other systems, such as RF 107 and/or AV 109. At a stage 440, the APP is aware of configured media device "A" presence on the wireless network and detects that media device "A" is presently in a configured state and therefore has a status of "configured." The APP harvests the configuration (CFG) (e.g., CFG 125 of FIG. 2B) from configured media device "A", and at a stage 442 copies (e.g., via a wireless transmission over the wireless network) the CFG to the un-configured media device "B." At a stage 444, previously un-configured media device "B" becomes a configured media device "B" by virtue of having CFG resident in its system (e.g., CFG 125 in DS system 103 in FIG. 1). After media device "B" has been configured, the flow may terminate at a stage 446. In other examples, the APP may obtain the CFG from a location other than the configured media device "A", such as the Internet or the Cloud as depicted in FIG. 2B. Therefore, at the stage 440, the APP may download the CFG from a web site, from Cloud storage, or other locations on the Internet or an intranet for example.

In the examples depicted in FIGS. 2A-4B, after one of the media devices is configured, additional media devices that are added by the user or are encountered by the user may be configured without the user (e.g., user 201) having to break a BT pairing with one media device and then establishing another BT pairing with a media device the user is adding to his/her media device ecosystem. Existing media devices that are configured (e.g., have CFG 125) may be used to configure a new media device using the wireless systems (e.g., acoustic, optical, RF) of the media devices in the ecosystem. If multiple configured media devices are present in the ecosystem when the user adds a new un-configured media device, configured media devices may be configured to arbitrate among themselves as to which of the configured devices will act to configured the newly added un-configured media device. For example, the existing media device that was configured last in time (e.g., by a date stamp on its CFG 125) may be the one selected to configure the newly added un-configured media device. Alternatively, the existing media device that was configured first in time (e.g., by a date stamp on its CFG 125) may be the one selected to configure the newly added un-configured media device. The APP 225 on the user device 220 or other, may be configured to make the configuration process as seamless as possible and may only prompt the user 201 that the APP 225 has detected an un-configured media device and query the user 201 as to whether or not the user 201 wants the APP 225 to configure the un-configured media device (e.g., media device 100b). If the user replies "YES", then the APP 225 may handle the configuration process working wirelessly with the configured and un-configured media devices. If the user 201 replies "NO", then the APP 225 may postpone the configuration for a later time when the user 201 is prepared to consummate the configuration of the un-configured media device. In other examples, the user 201 may want configuration of un-configured media devices to be automatic upon detection of the un-configured media device(s). Here the APP and/or configured media devices would automatically act to configure the un-configured media device(s).

APP 225 may be configured (e.g., by the user 201) to automatically configure any newly detected un-configured media devices that are added to the user's 201 ecosystem and the APP 225 may merely inform the user 201 that it is configuring the un-configured media devices and inform the user 201 when configuration is completed, for example. Moreover, in other examples, once a user 201 configures a media device using the APP 225, subsequently added un-configured media devices may be automatically configured by an existing configured media device by each media device recognizing other media devices (e.g., via wireless systems), determining the status (e.g., configured or un-configured) of each media device, and then using the wireless systems (e.g., RF 107, AV 109, I/O 105, OPT 185, PROX 113) of a configured media device to configure the un-configured media device without having to resort to the APP 225 on the user's device 220 to intervene in the configuration process. That is, the configured media devices and the un-configured media devices arbitrate and effectuate the configuring of un-configured media devices without the aid of APP 225 or user device 220. In this scenario, the controller 101 and/or CFG 125 may include instructions for configuring media devices in an ecosystem using one or more systems in the media devices themselves.

In at least some examples, the structures and/or functions of any of the above-described features may be implemented in software, hardware, firmware, circuitry, or in any combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, scripts, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" may refer, for example, to an algorithm or a portion thereof, and/or logic implemented in either hardware circuitry or software, or a combination thereof. These may be varied and are not limited to the examples or descriptions provided. Software, firmware, algorithms, executable computer readable code, program instructions for execution on a computer, or the like may be embodied in a non-transitory computer readable medium.

Ad Hoc WiFi Network Configuration

Figure 5A:
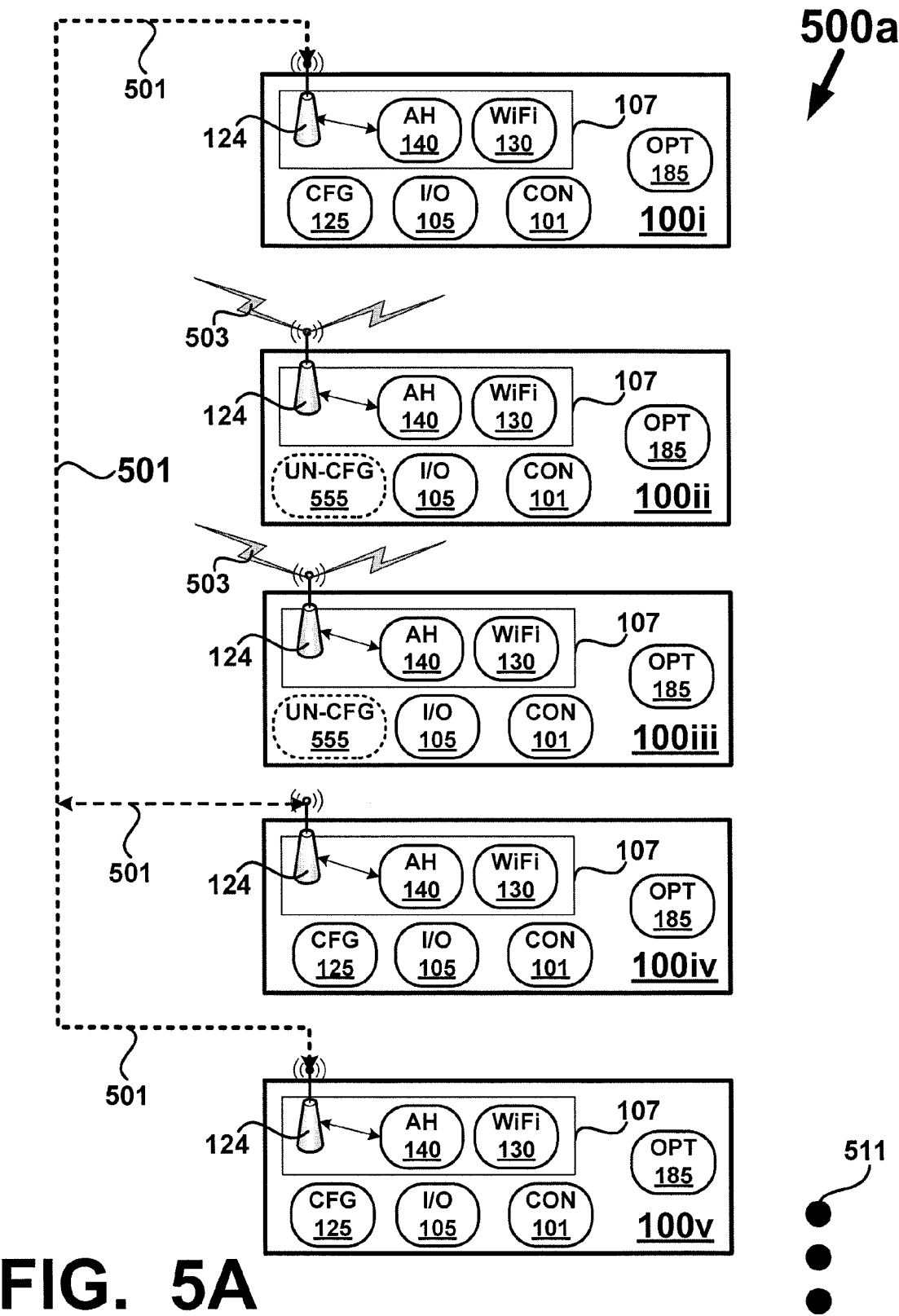
FIGS. 5A through 5D depict block diagrams of a plurality of media devices communicating over an Ad Hoc WiFi network and configuring un-configured media devices using the Ad Hoc WiFi network according to an embodiment of the present application.

FIGS. 5A through 5D depict block diagrams of a plurality of media devices configured to communicate over an Ad Hoc WiFi network. As will be described in greater detail below, un-configured media devices may also be configured using the Ad Hoc WiFi network. In FIG. 5A, a scenario 500a depicts a plurality of media devices 100i-100v. Although only five media devices are depicted, there could be as few as two media devices or more than the five media devices shown, as denoted by 511. Each of the media devices are pre-configured to communicate over an Ad Hoc WiFi network 501 using their respective Ad Hoc WiFi transceivers denoted as AH 140 (see FIG. 1). Here for purposes of explanation, other components of RF system 107, such as BT 120 are not depicted. In scenario 500a three of the media devices 100i, 100iv, and 100v have already been configured as described above and include CFG 125. Further, media devices 100i, 100iv, and 100v are depicted in their "powered up" state and media devices 100i, 100iv, and 100v are in wireless communications with each other over Ad Hoc WiFi network 501. Media devices 100i, 100iv, and 100v have their respective AH 140 electrically coupled with antenna 124. Each media device depicted in FIG. 5A is pre-configured (e.g., at the factory or somewhere in the stream of commerce) to wirelessly communicate with one another over the Ad Hoc WiFi network 501 using their respective AH 140. Two additional media devices 100ii and 100iii are introduced into scenario 500a and are placed in the "powered up" state (e.g., they are turned on). Media devices 100ii and 100iii are initially in an un-configured state as denoted by UN-CFG 555. For example, media devices 100ii and 100iii may be newly purchased media devices to be added to the three device ecosystem of FIG. 5A. After being powered up, media devices 100ii and 100iii activate their respective AH 140 and begin broadcasting their status and listening for RF signals from other media devices that are broadcasting on the Ad Hoc WiFi network 501 as denoted by 503.

Figure 5B:
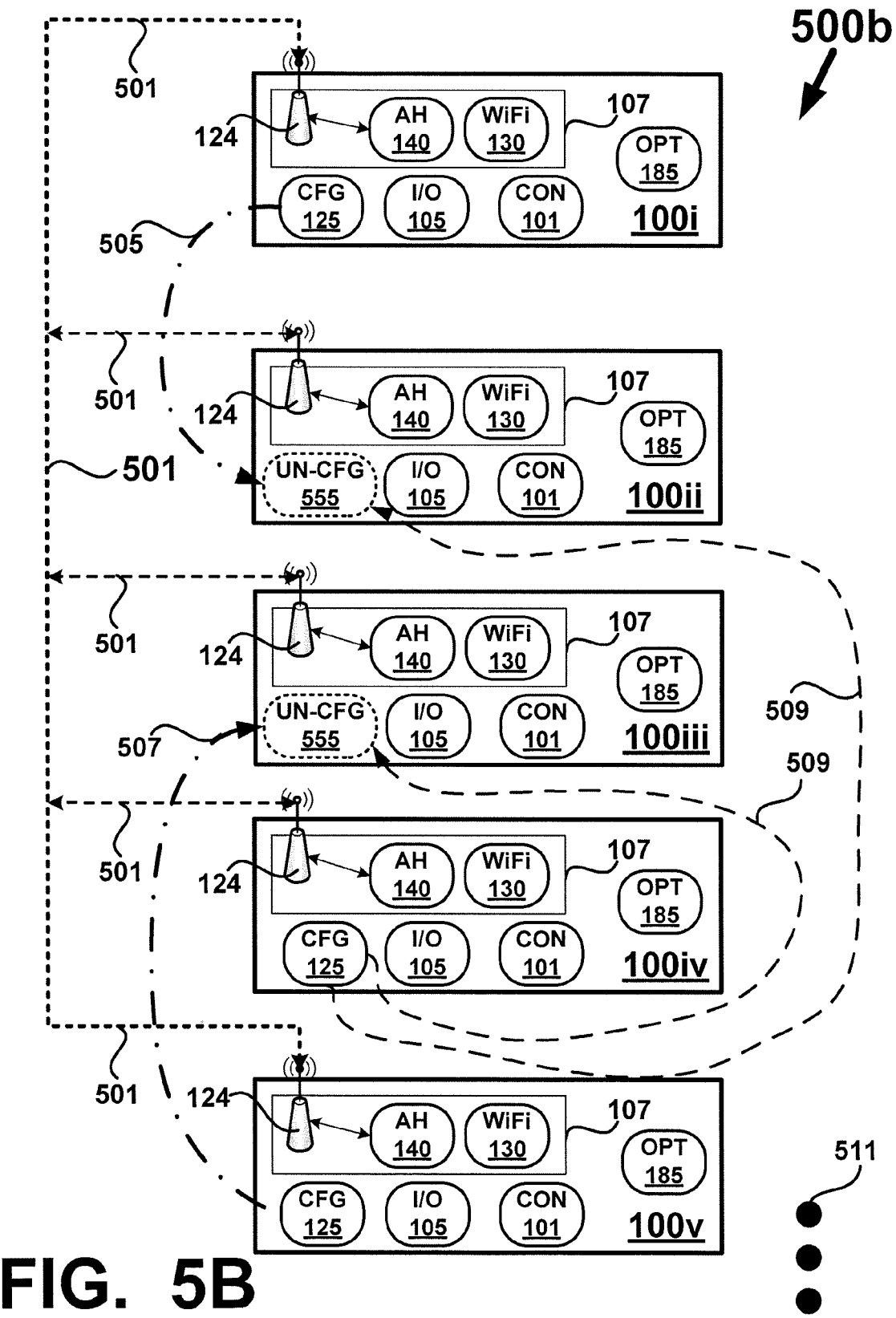

In FIG. 5B, scenario 500b depicts media devices 100ii and 100iii having successfully joined the Ad Hoc WiFi network 501. Moreover, media devices 100ii and 100iii recognize each other and are recognized by the other media devices 100i, 100iv, and 100v. Therefore, all five of the media devices are able to wirelessly communicate with one another other over the Ad Hoc WiFi network 501. Media devices 100ii and 100iii have already broadcast their status and that status includes the information that both devices are in an un-configured state UN-CFG 555. One or more of the configured media devices (e.g., having CFG 125) communicate over 501 to the un-configured media devices and initiate pre-determined handshakes, protocols, or the like necessary to effectuate transmitting CFG 125 to the un-configured media devices. In one example, media device 100i transmits data representing its CFG 125 to un-configured media device 100ii as denoted by dashed line 505, and media device 100v transmits data representing its CFG 125 to un-configured media device 100iii as denoted by dashed line 507. After the data is transmitted, media device 100ii has CFG 565 and media device 100iii has CFG 575. In this example, each un-configured media device received its configuration data from a different configured media device.

In another example, media device 100iv transmits data representing its CFG 125 to un-configured media device 100ii and 100iii as denoted by dashed lines 509 such that both un-configured media devices receive their configuration data (e.g., CFG 125) from the same configured media device.

Figure 5C:
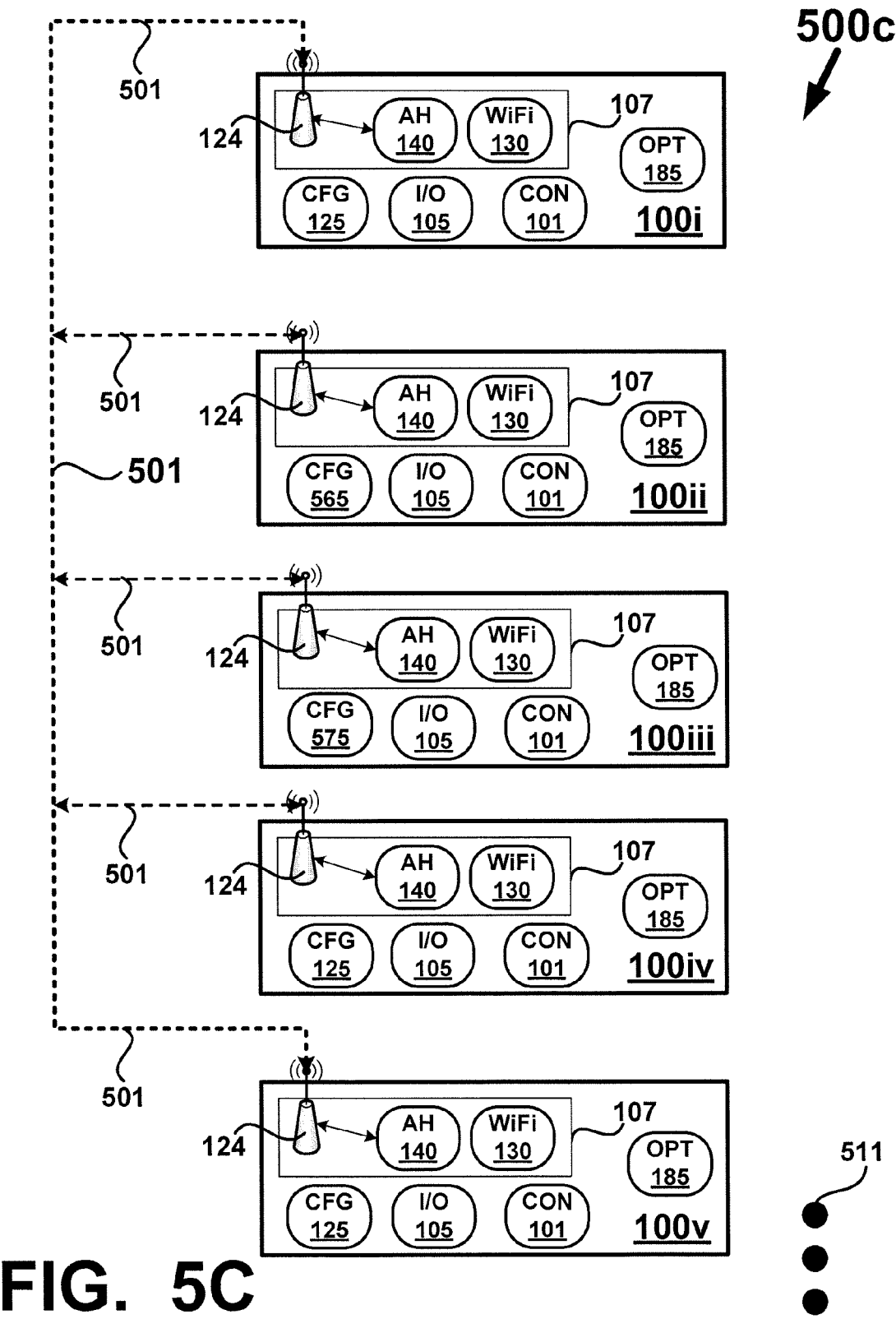
Figure 5D:
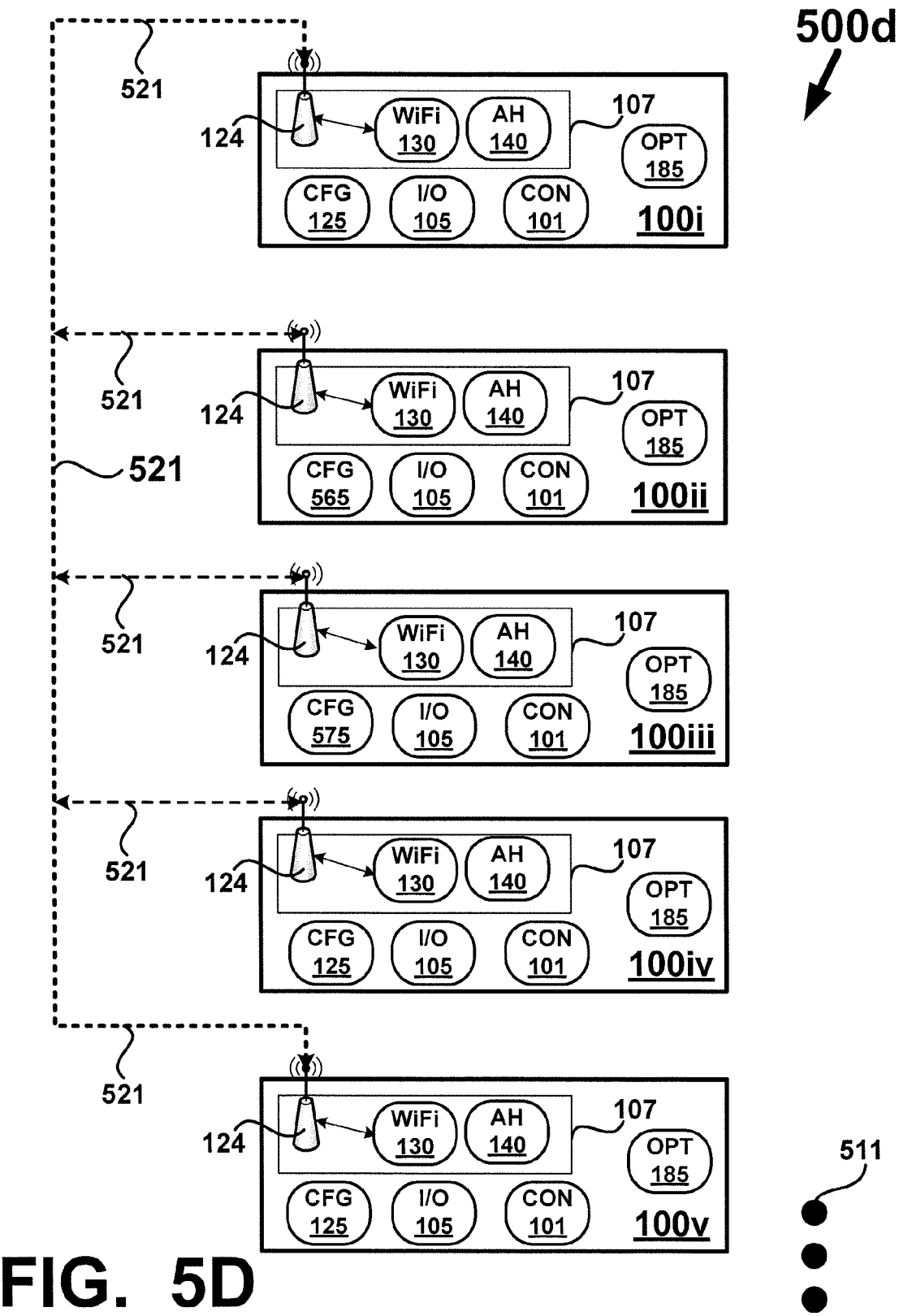

After all the un-configured devices have received their respective CFG data (e.g., CFG 565, CFG 575), a scenario 500c in FIG. 5C depicts all five media devices 100i-100v being configured media devices (e.g., CFG 125, CFG 565, CFG 575). In FIG. 5D, after all un-configured media devices have been configured using the Ad Hoc WiFi Network 501, in a scenario 500*d*, media devices 100*i*-100*v* may be configured to switch from their respective AH 140 transceivers to their WiFi 130 transceivers and to communicate with one another over wireless network 521. In FIGS. 5A-5D other systems in each media device including but not limited to the controller 101 and the I/O system 105 may be used to coordinate and control the Ad Hoc WiFi network 501, transceivers AH 140, transceivers WiFi 130, and the transmitting of CFG 125 to un-configured media devices.

FIGS. 5A-5D depict another example of how un-configured media devices added to or introduced into an ecosystem of configured media devices may be configured with minimal user 201 intervention. The user 201 need not use BT to break and make BT pairing connections in order to configure media devices. Here, the only intervention on part of the user 201 may include just powering up the media devices 100*i*-100*v*, or powering up at least one configured media device and one or more un-configured media devices. An application such as APP 225 on a user device is not required to harvest the CFG 125 or intervene in any way to make the configuration of un-configured media devices happen. The scenarios depicted in FIGS. 5A-5D may be used to re-configure already configured media devices. For example, user 201 may make changes/editions to APP 225 on a user device 202. The APP 225 may then act to re-configure an already configured media device (e.g., media device 100*v*). Subsequently, the re-configured media device 100*v* may wirelessly transmit its new configuration to the other media devices in its ecosystem (e.g., using AH 140, BT 120, or WiFi 130, or other wireless systems). Any re-configured media device may act to wirelessly transmit its new configuration to other media devices as they are introduced into its ecosystem or become within its wireless range (e.g., RF range, acoustic range, or optical range). As one example, if an ecosystem includes configured media devices "A" and "B" and device "A" is re-configured, then after being re-configured, device "A" may act to re-configure device "B". Upon introduction of a configured media devices "C" into the ecosystem, either device "A" or device "B" may act to re-configure device "C". One or more of the wireless systems may be used to effectuate a re-configuration of a media device.

Acoustic Signature Configuration

Figure 6A:
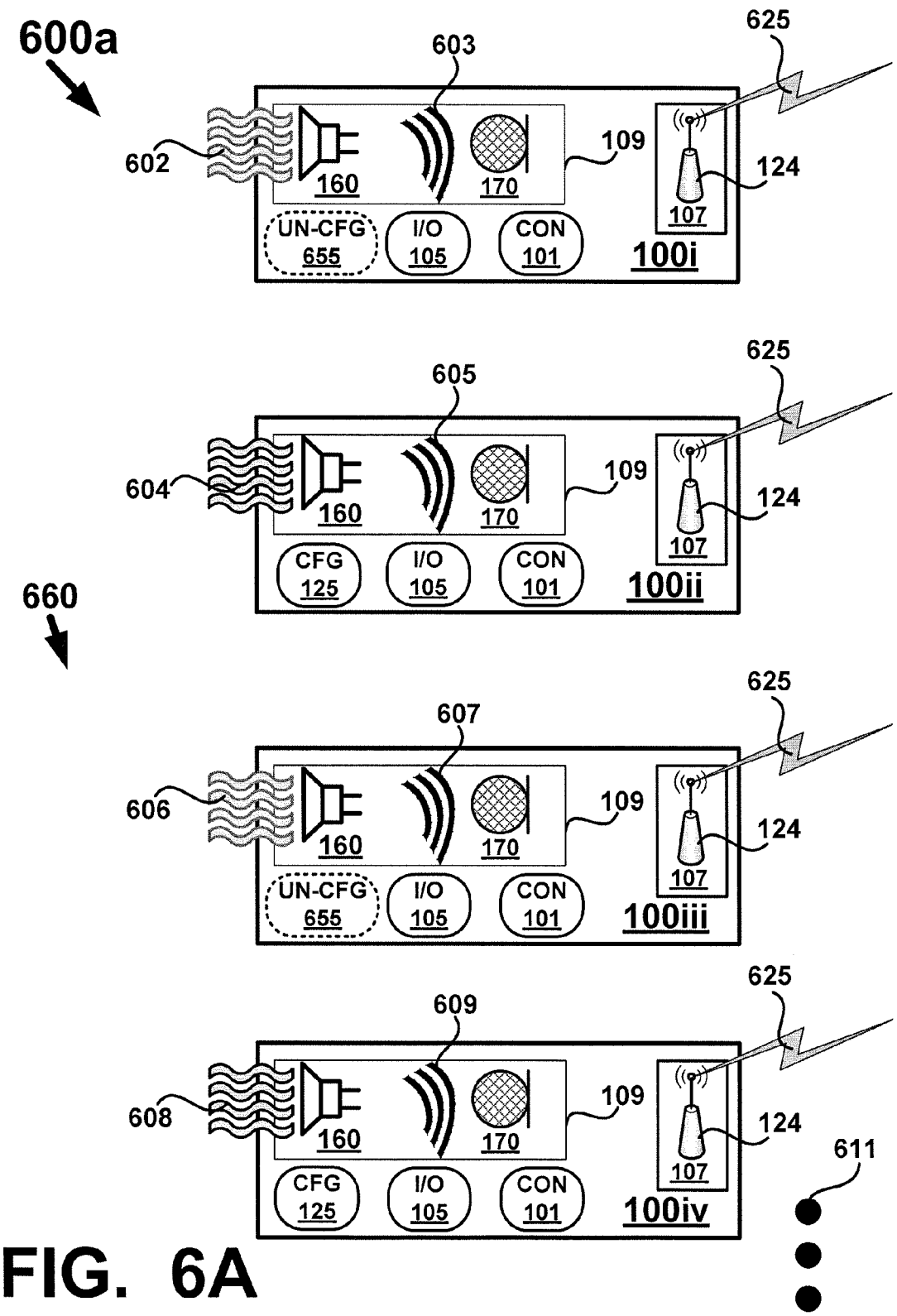
Figure 6C:
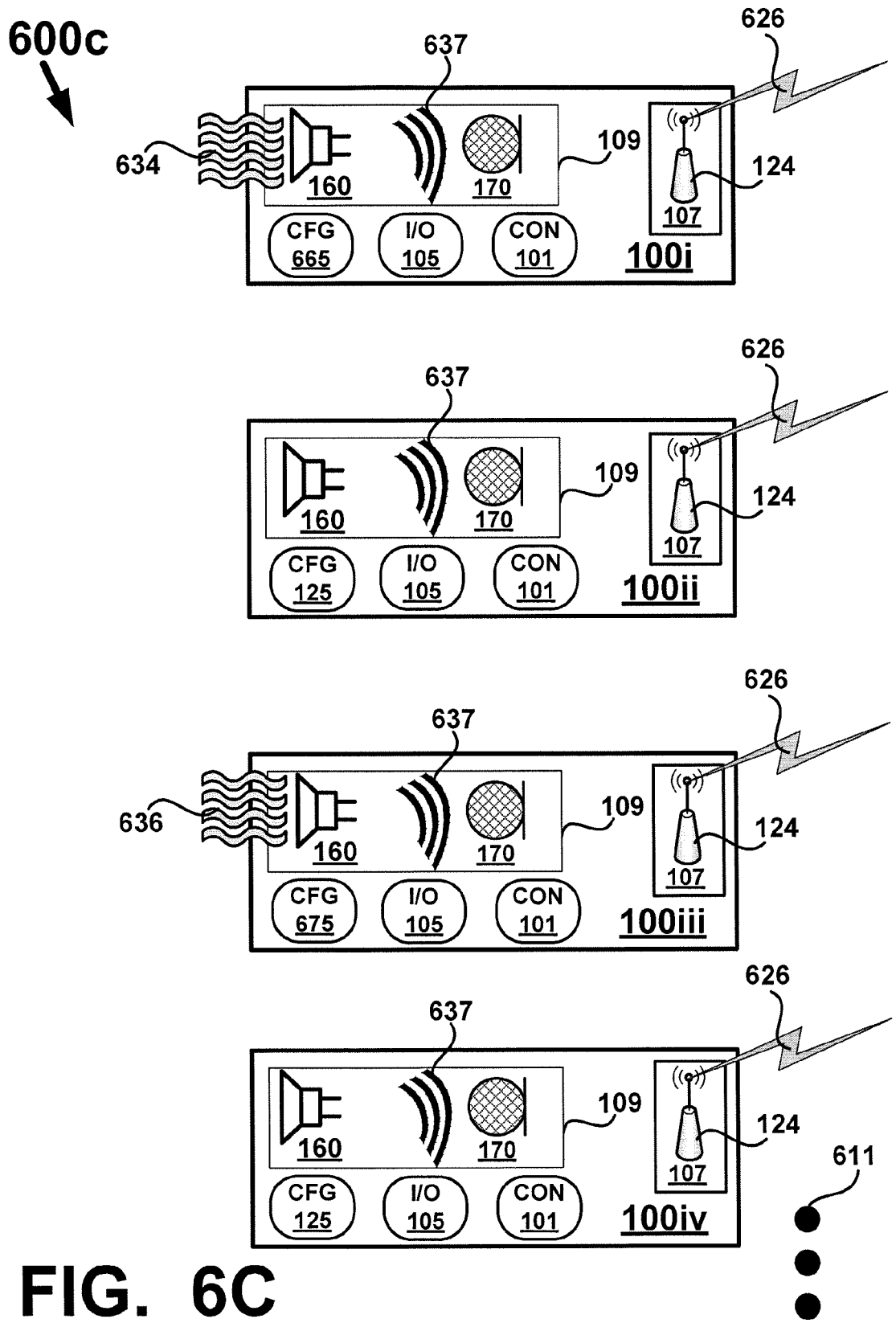

Reference is now made to FIGS. 6A-6C where a plurality of media devices 100*i*-100*iv* are depicted in acoustic proximity of one another. Acoustic proximity may include all of the media devices positioned in a space 660 in which acoustic sounds transmitted by any one of the media devices may be received by the other media devices without significant acoustic attenuation/degradation that would prevent each media device from accurately receiving data in acoustic signals transmitted by the other media devices. Significant acoustic attenuation may be caused by ambient noise, walls, sound absorbing materials, sound reflecting materials, or other structures that attenuate or completely block acoustic signals transmitted by the media devices such that those signals do not reach other media devices at all or at a sound pressure level that is below an acceptable level for the transducers (e.g., a microphone) to convert to a usable signal for processing in the media devices.

In FIG. 6A, a scenario 600*a* includes the plurality of media devices 100*i*-100*iv*, each media device including an A/V system 109 that includes a plurality of audio transducers, including but not limited to loudspeaker 160 and microphone 170. Although four media devices are depicted, there may be more or fewer devices used as denoted by 611. For purposes of explanation, media devices 100*i*-100*iv* are assumed to be "powered up" in FIG. 6A. Media devices 100*i* and 100*iii* are un-configured as denoted by UN-CFG 655; whereas, media devices 100*ii* and 100*iv* are configured as denoted by CFG 125. After being "powered up" each media device is configured to transmit a unique acoustic signature using its respective SPK 160 as denoted by acoustic waves 602-608 which include encoded information (e.g., data) that comprises the unique acoustic signature. For example, transmission of the acoustic waves 602-608 may be triggered by an event such as being "powered up", a RF signal from the RF systems 107, the actuation of a button or switch, or a command from a user device (e.g., APP 225), just to name a few. The MIC 170 of each media device receives the acoustic waves 602-608 from the other media devices as denoted by 603-609. For example, media device 100*i* receives the acoustic waves 604-608 from the other media devices as acoustic wave 603. A/V system 109 may decode a signal generated by MIC 170 (e.g., using an ADC) to extract the information (e.g., data) contained in the unique acoustic signature of media devices 100*ii*-100*iv*. For acoustic wave 603, media device 100*i* may decode the various unique acoustic signatures to determine that 100*ii* and 100*iv* are configured (CFG 125) and 100*iii* is un-configured (UN-CFG 655). Other information may be included (e.g., encoded in) the unique acoustic signature of the media devices. Similarly, media devices 100*ii*, 100*iii*, and 100*iv* receive and decode their acoustic waves 605, 607, and 609 respectively. In order to prevent all media devices from transmitting their acoustic waves 602-608 at the same time, thereby creating possible confusion as to which devices signals are being received at a MIC 170 at any point in time, each media device may be configured to transmit its acoustic wave in response to a command, an event, or some other orderly sequence or pattern.

For example each media device may have a unique address that is pre-configured at the factory, set by a user, or used by some other system in the device (e.g., a unique MAC address for WiFi 130). After being "powered up" each device may simply transmit an acoustic wave that includes an encoded address. After a predetermined amount of time (e.g., approximately 10 seconds) if no additional acoustic transmission are received, then the media device with the highest address or the lowest address is the first media device to transmit its unique acoustic signature, followed by the next highest or next lowest address, and so on. After all of the media devices have finished transmitting their unique acoustic signatures (e.g., have spoken), media devices that are un-configured (e.g., UN-CFG 655) may be configured (e.g., CFG 125) using the data in one of the configured media devices.

Moving on to FIG. 6B, in scenario 600*b* all media devices 100*i*-100*iv* have spoken and each device is apprised of the status of the other media devices. Each media device knows which media devices are configured and which are un-configured. Here, configured media device 100*iv* transmits an acoustic configuration signal 628 that is received by MIC's 170 in all the devices. Signal 628 includes data for CFG 125. Un-configured media devices 100*i* and 100*iii* receive signal 628 at their respective MIC's 170, decode the signal 628, and extract the data that comprises CFG 125. Un-configured media devices 1001 and 100*iii* may decode signal 628 substantially at the same time or in a sequence. For example, if a sequence is used, the un-configured media device with the highest or lowest address may configure itself using the signal 628, followed by the next un-configured media device having the next highest or lowest address.

In FIG. 6C, in a post-configuration scenario 600*c*, media devices 100*i* and 100*iii* now include CFG 665 and CFG 675 and are configured media devices. Optionally, media devices 100*i* and 100*iii* may transmit audio signals 634 and 636 that broadcast that devices 100*i* and 100*iii* were successfully configured and those signals are received 637 by all the media devices. Furthermore, post-configuration, media devices 100*ii*-100*iv* may activate their respective RF systems 170 and wirelessly communicate 626 with each other or with user devices 202 using whatever systems are appropriate, such as BT 120, WiFi, 130, or AH 140, for example.

The frequency range of acoustic signals generated by SPK 160 and received by MIC 170 will be application dependent. In some examples, SPK 160 is configured to generate acoustic signals in a range from about 20 Hz to about 20 kHz which is within the hearing range of most human beings, and MIC 170 is configured to receive and produce an output signal for the acoustic signals generated by SPK 160. In another example, SPK 160 is configured to generate acoustic signals in a range greater than 20 kHz and MIC 170 is configured to receive and produce an output signal for the acoustic signals generated by SPK 160. Here the acoustic signals generated by SPK 160 may be ultrasonic in frequency. In yet another example, SPK 160 is configured to generate acoustic signals in a range less than 20 Hz and MIC 170 is configured to receive and produce an output signal for the acoustic signals generated by SPK 160. Here the acoustic signals generated by SPK 160 may be infrasonic in frequency. The ultrasonic and infrasonic acoustic signals may be inaudible to human beings. In other examples, media devices may include a sensor such as an accelerometer to detect the infrasonic acoustic signals generated by SPK 160 (e.g., as airborne or structure borne low frequency (LF) vibrations). Systems such as I/O 105 or PROX 113 may include the sensor for detecting LF vibrations, for example.

Hybrid Configuration

Figure 7A:
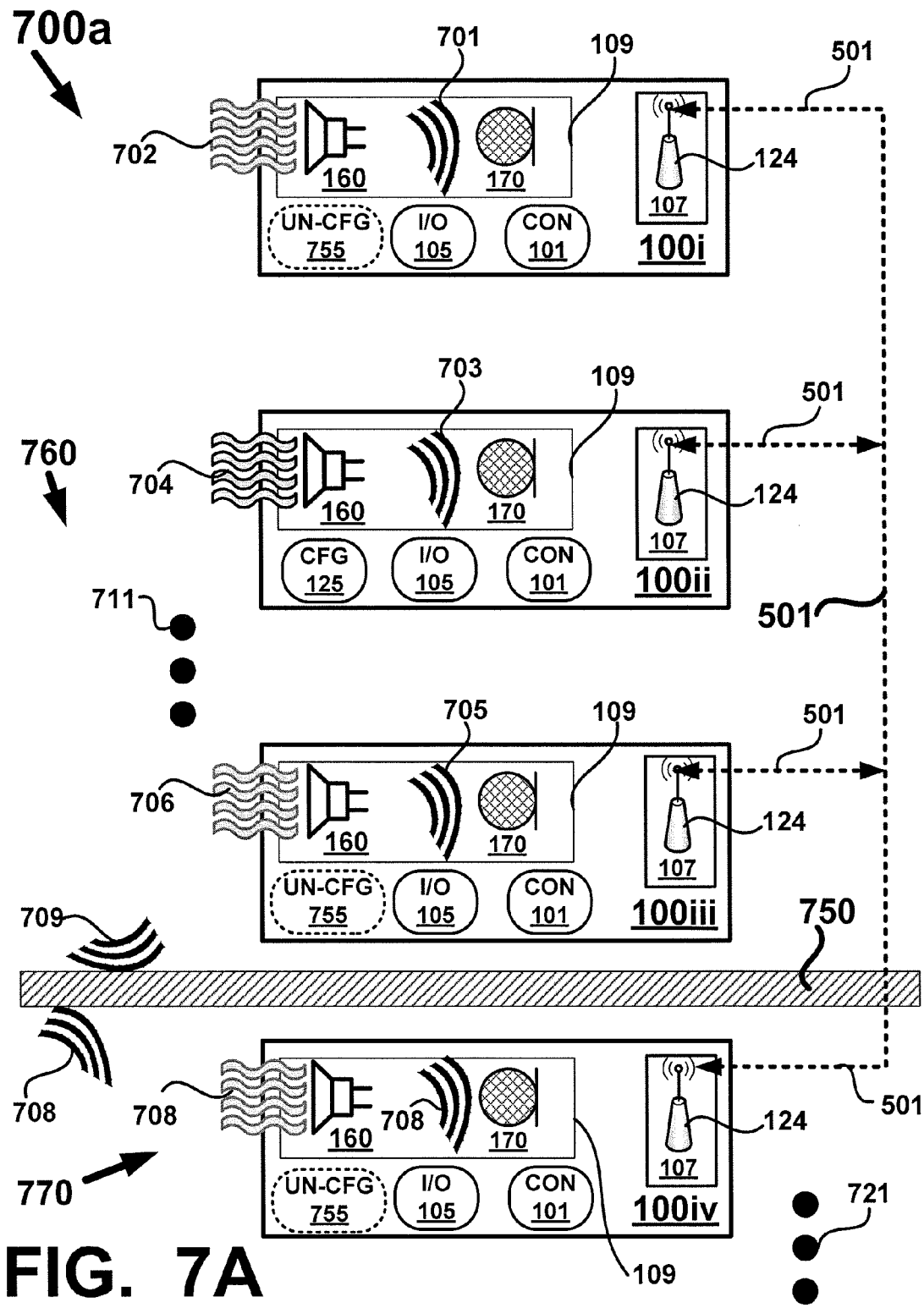
FIGS. 7A-7C depict block diagrams of a plurality of media devices communicating over an Ad Hoc WiFi network with at least some of the plurality of media devices communicating acoustically using transducers to transmit and receive data respectively according to an embodiment of the present application.
Figure 7B:
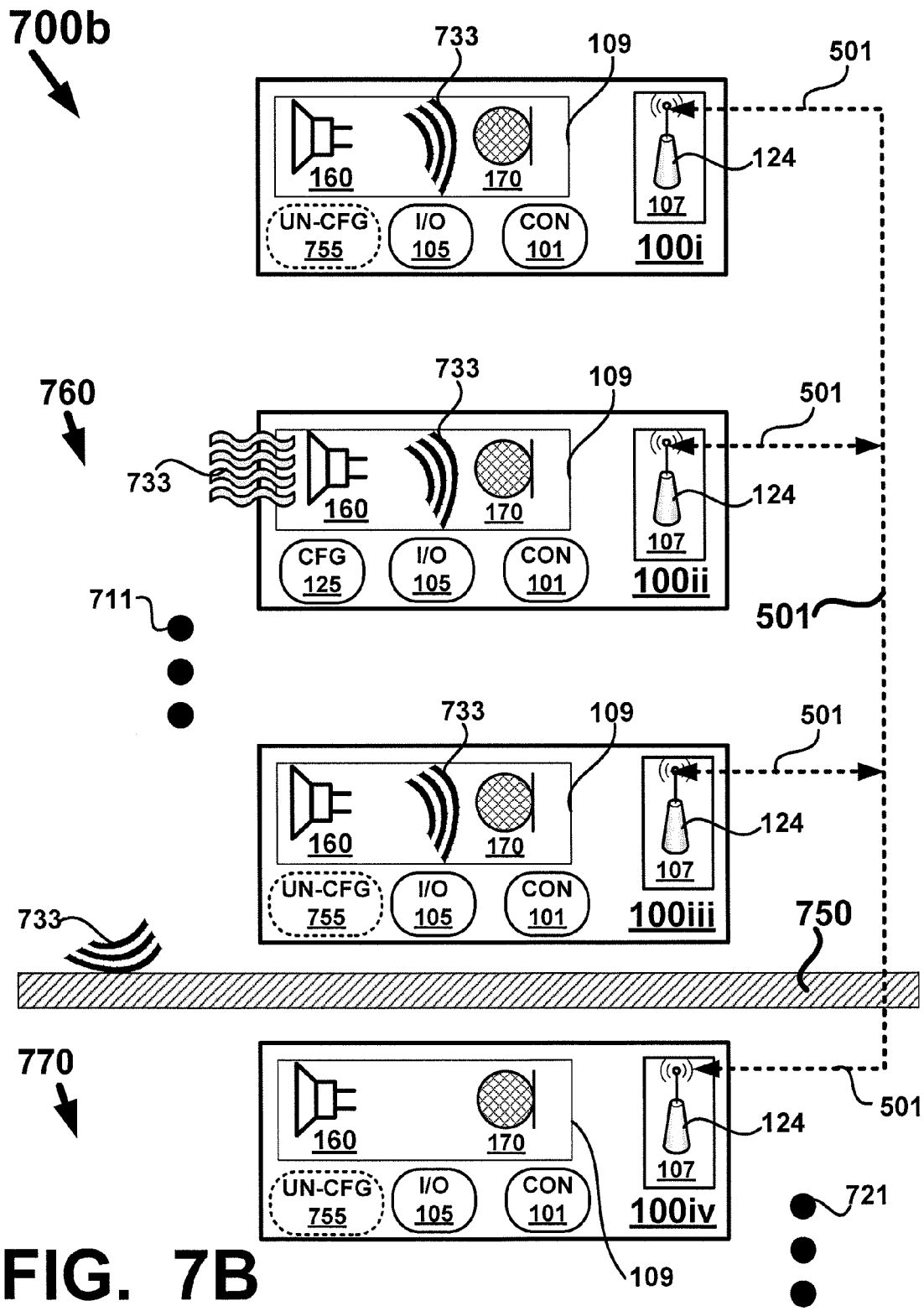
Figure 7C:
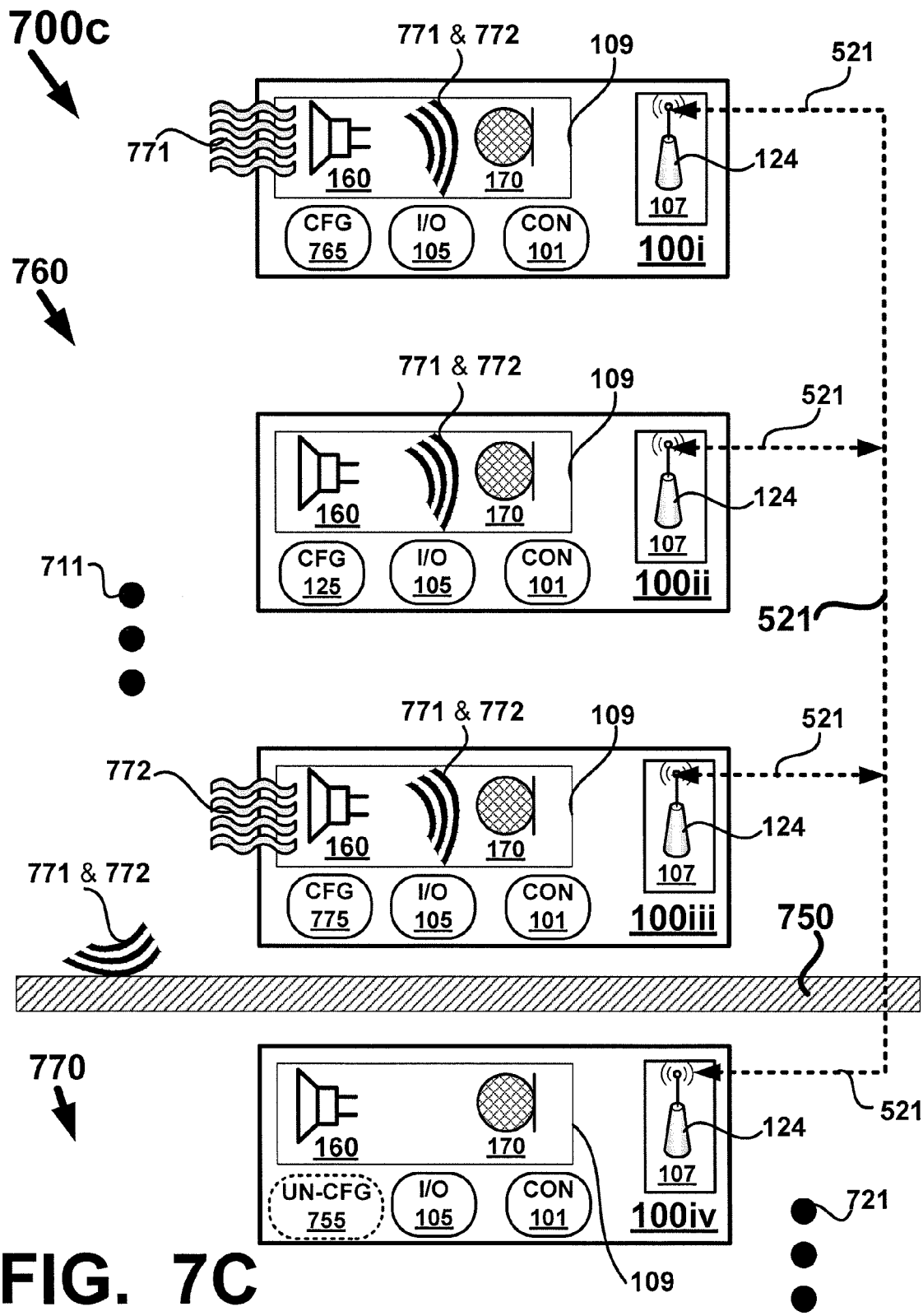

Attention is now directed to FIGS. 7A-7C where a plurality of media devices 100*i*-100*iv* are in wireless communications with one another over an Ad Hoc wireless network 501 as was described above in reference to FIGS. 5A-5D where the media devices depicted in FIGS. 5A-5D were part of the same ecosystem (e.g., the user 201 intends them to work in harmony with each other) and some of the media devices were un-configured. In FIG. 7A, scenario 700*a* depicts three of the media devices 100*i*-100*iii* being part of an ecosystem in a space 760 (e.g., a living room of the user 201) and a totally unrelated media device 100*iv* in an adjacent space 770 that is within adequate RF signal strength range of the other media devices 100*i*-100*iii* in space 760. Space 760 may include more or fewer media device as denoted by 711. Space 770 may include more media devices than depicted as denoted by 721. In space 760 media devices 100*i* and 100*iii* are un-configured (UN-CFG 755) and media device 100*ii* is configured (CFG 125). In space 770 media device 100*iv* is un-configured (UN-CFG 755). Therefore, scenario 700*a* depicts one example of a foreseeable scenario where the Ad Hoc wireless network 501 and AH 140 transceivers that are pre-provisioned (e.g., by the manufacturer) to recognize and communicate with one another may interact with media devices in un-related ecosystems (e.g., ecosystem in space 760 interacting with un-related eco-system in space 770). For example, adjacent apartments in an apartment building, adjacent offices in an office complex, and adjacent homes in a neighborhood may all be within adequate signal strength range of each other. Unless distance (e.g., 1/R²), RF blocking obstructions or structures, prevents media devices in un-related eco-systems from wirelessly communicating with one another, each media device may be configured to ignore commands, configurations, etc. from media devices in an un-related eco-system.

To that end, in FIG. 7A, media device 100*iv* in space 770 is un-related to the media devices in space 760, but is within adequate RF signal strength range of those devices and the Ad Hoc wireless network 501 they are connected in common with. In that one of the goals of device configuration is to have media device 100*ii* use its CFG 125 to configure un-configured media devices 100*i* and 100*iii* with minimal user 201 involvement, there is a risk that using the scenarios depicted in FIGS. 5A-5D may result in media device 100*ii* configuring un-configured media device 100*iv* in space 770 because it has detected its presence on the Ad Hoc wireless network 501 and knows that its status is un-configured UN-CFG 755.

In FIG. 7A, a wall or other structure separates space 760 from 770 and may serve as an acoustic barrier 750 to sounds 708 and 709 that are generated by SPK 160 of media devices 100*i*-100*iii* and 100*iv*. Therefore, even though the media devices are within adequate RF signal strength range as denoted by 501, the acoustic barrier 750 prevents signals 709 from SPK 160 of media devices 100*i*-100*iii* from being received by MIC 170 of media device 100*iv*. Similarly, the barrier 750 prevents signals 708 from SPK 160 of media device 100*iv* from being received by the MIC's 170 of media devices 100*i*-100*iii*. Accordingly, both acoustic signals and RF signals may be used in a hybrid Configuration scenario so that only those media devices that may receive via MIC 170 acoustic signals from other media devices in its ecosystem and is aware of and connected with those same media devices via the Ad Hoc wireless network 501 may be affected by or affect another media device in its eco-system.

In FIG. 7A, for purposes of explanation it is assumed that all media devices are "powered up" and that media devices 100*i*-100*iii* have sensed and recognized one another via wireless 501 and acoustic means (702-706) and (701-705). Further, media device 100*iv* in space 770 has sensed and recognized media devices 100*i*-100*iii* in space 760 via wireless 501 and vice-versa. Therefore, media device 100*ii* is aware that media devices 100*i*, 100*ii*, and 100*iv* are un-configured.

Moving on to FIG. 7B, scenario 700*b* depicts media device 100*ii* transmitting acoustic configuration signal 733 that is received by MIC's 170 in all the media devices in the ecosystem of space 760. Acoustic barrier 750 blocks the acoustic configuration signal 733 and signal 733 is not received by MIC 170 of media device 100*iv*. Acoustic configuration signal 733 may include encoded information for data in CFG 125 that will be decoded and used by un-configured media devices 100*i* and 100*iii* to configure themselves. Alternatively, acoustic configuration signal 733 may be operative to instruct the un-configured media devices 100*i* and 100*iii* to be ready to receive wireless transmission of its CFG 125 over the Ad Hoc wireless network 501. In some examples, a combination of an acoustic configuration signal and a wireless RF signal may be used to transfer, copy, or write the CFG 125 to un-configured media devices.

In FIG. 7 a post-configuration scenario 700*c* depicts media devices 100*i* and 100*iii* as being configured with CFG 765 and 775, and media device 100*iv* remains un-configured UN-CFG 755. Configured media devices 100*i* and 100*iii* may wirelessly 501 and/or acoustically 771 and 772 broadcast that they have been successfully configured. Acoustic broadcast 771 and 772 are received 773 by all MIC's 170 in space 760 but not by MIC 170 in space 770. Post-configuration, RF systems 107 may switch from the Ad Hoc WiFi network 501 to the WiFi wireless network 521, or some other network such as Bluetooth®, for example.

In the examples depicted in FIGS. 6A-7C, the media devices may be configured to use other information and/or systems native to each media device to arbitrate which media devices may be configured, acted on, communicated with, etc. For example, each media device (e.g., in its DS 103 and/or RF system 107) may maintain a list of Media Access Control addresses (MAC addresses) for devices that have been established in its ecosystem. At configuration time or when other actions are taken that affect a media device, those media devices not listed in the list of MAC addresses will not be affected. Therefore, acoustic signals, wireless signals, and data (e.g., MAC addresses), and other information or signals may be used to manage media devices in an ecosystem while preventing unintentional interaction with other media devices that are not part of the ecosystem. APP 225 may be used to make and update information such as MAC addresses for one or media devices. MAC addresses may be added to the list as media devices are added to an ecosystem and MAC addresses may be removed from the list as media devices are removed from the ecosystem, for example.

In the examples depicted in FIGS. 6A-7C or in other FIGS. herein, the media devices may be configured to use other wireless systems to manage media device configuration and operation. For example, in scenarios 700a-700c the BT 120, WiFi 130 or other wireless systems may be used in place of or in addition to the AH 140 and AV 109 to accomplish the configuration of un-configured media devices in space 760. Media devices may be equipped with an optical system for wireless communications (e.g., Infrared or other) and media device configuration and operation may be effectuated using optical communication solely or in conjunction with the other systems such as RF 107 and/or AV 109. An optical transmitter, such as a LED or IR LED may be used to transmit encoded IR signals and an IR receiver such as a photo diode or the like may be used to receive the IR signals which are then decoded and communicated to a system such as controller 101, for example. As one example, the media devices 100 in an ecosystem, such as those depicted in FIGS. 2A-2B, 5A-8B may use OPT 185 in their respective I/O 105 systems to communicate with one another and to accomplish specific tasks such as configuration, re-configuration, and control, just to name a few.

As another example, in scenarios 700a-700c, OPT 185 may be used in place of AV 109 such that acoustic communications between media devices (e.g., 100i, 100ii, and 100iii) is replaced with optical communications. Here, barrier 750 may act to prevent optical signals (e.g., from transmitter 185t) from being received and/or detected by receiver 185r in the OPT 185 of media device 100iv in space 770. Therefore, even though media device 100iv may be in RF communications (e.g., 501 or 521) with media devices 100i, 100ii, and 100iii in space 760, configuration of un-configured media devices 100i and 100iii may proceed using any combination of optical (e.g., in place of acoustic from AV 109) and RF (e.g., using RF 107) systems of the 100i, 100ii, and 100iii. In that un-configured media device 100iv in space 770 does not receive the optical component of the configuration signal from media device 100ii in space 760 (e.g., due to barrier 750), media device 100iv is not configured and is not affected by the configuration activity in the un-related ecosystem of space 760.

Figure 7D:
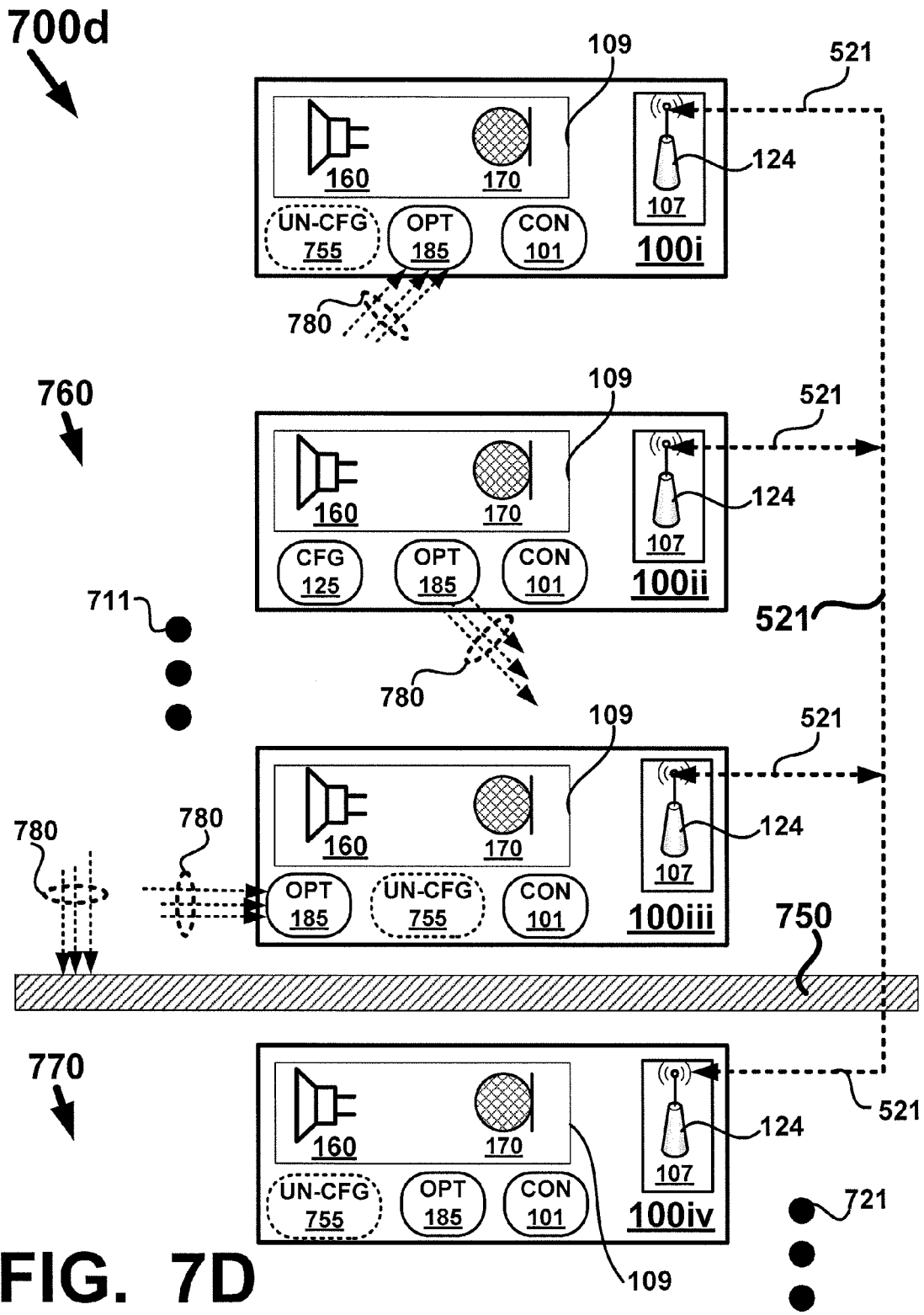
FIGS. 7D-7E depict block diagrams of a plurality of media devices communicating over a wireless network with at least some of the plurality of media devices communicating optically using an optical transceiver to optically transmit and receive data respectively according to an embodiment of the present application.
Figure 7E:
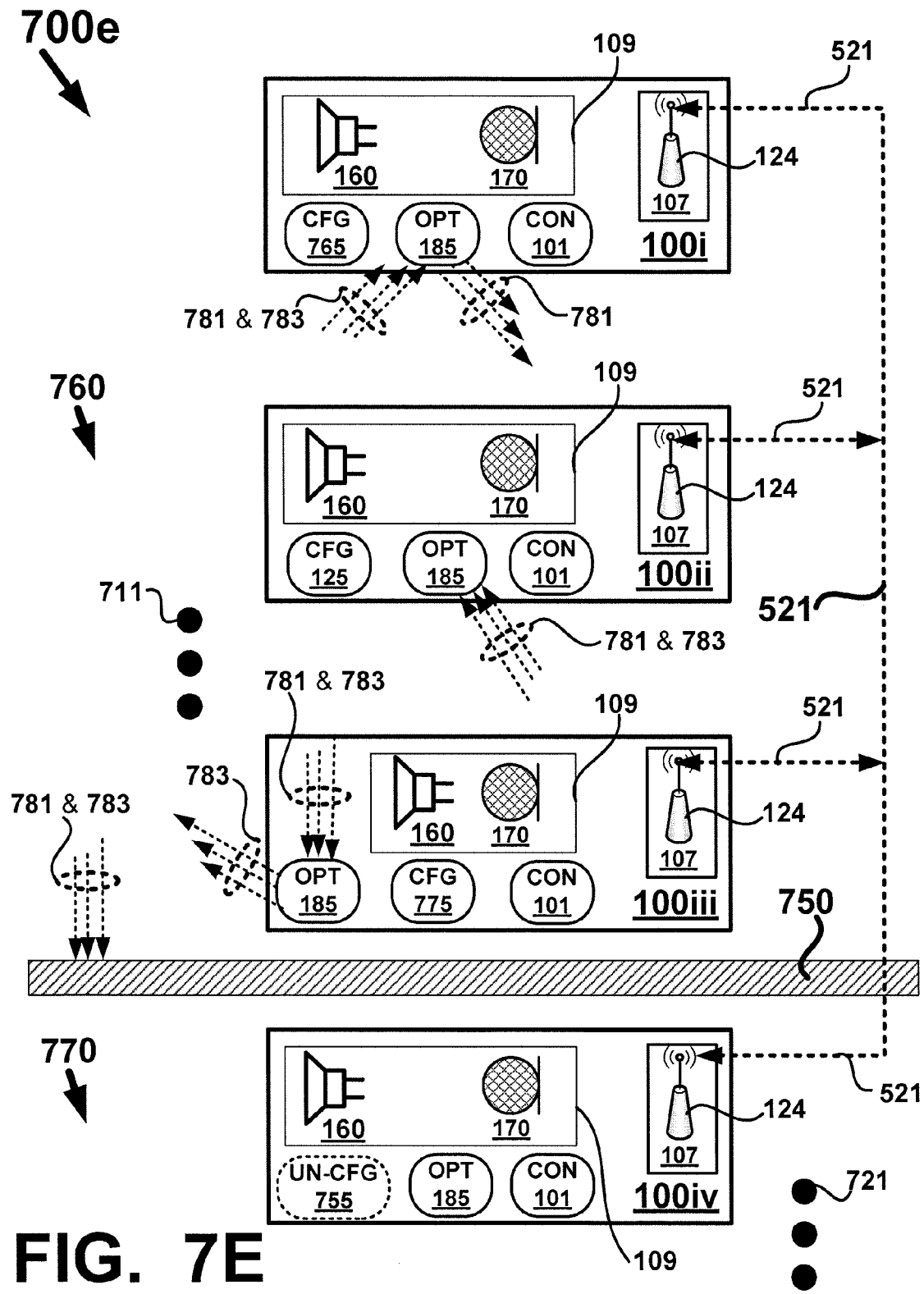

Attention is now directed to FIGS. 7D-7E, where scenarios 700d and 700e depict one example of wireless communications between media devices in an ecosystem using optical and/or RF communications. In scenario 700d of FIG. 7D, media devices 100i and 100iii in space 760 are un-configured (UN-CFG 755) as described above. Media devices in space 760 and 770 are aware of one another via their respective RF 107 systems and are depicted here in wireless communications 521 via WiFi 130, although other RF systems such as BT 120, AH 140, or other (e.g., 150) may be used instead of or in addition to WiFi 130. Optical system OPT 185 in configured media device 100ii is aware of the un-configured states of media devices 100i, 100iii, and 100iv. OPT 185 uses its optical transmitter (e.g., 185t of FIG. 1) to send an optical configuration signal 780 that is received by the optical receivers (e.g., 185r of FIG. 1) in the OPT 185 of the un-configured media devices 100i and 100iii. Structure 750 blocks or otherwise attenuates optical configuration signal 780 such that un-configured media device 100iv in un-related ecosystem of space 770 does not receive the optical configuration signal 780 at its optical system OPT 185.

Continuing on at FIG. 7E, in scenario 700e un-configured media devices 100i and 100iii have been configured as denoted by CFG 765 and CFG 775. Media devices 100i and 100iii may optically signal that they have been successfully configured (e.g., status reporting) by transmitting optical signals 781 and 783 respectively that are received at OPT 185 of already configured media device 100ii. Structure 750 blocks or otherwise attenuates optical signals 781 and 783 such that un-configured media device 100iv in un-related ecosystem of space 770 does not receive optical signals 781 and 783 at its optical system OPT 185. The actual data comprising the CFG's 765 and 775 may be transmitted using the OPT 185 and/or RF 107 of media device 100ii. In some examples, other wireless systems such as AV 109 may be used in conjunction with OPT 185 and/or RF 107 to effectuate the configuration, re-configuration, status reporting, etc. between media devices in an ecosystem. As is typical in some optical signaling systems, distance, optical noise, objects, people, surfaces, atmospheric conditions, and the like may block, reflect, refract, modulate, or attenuate optical signals such that successful optical signaling may not be practical or possible. To that end, media devices may be configured to detect and correct optical signaling problems by switching to other systems to effectuate successful wireless communications. For example, in scenarios 700d and 700e, if media device 100i successfully receives optical configuration signal 780 and media device 100iii does not successfully receive optical configuration signal 780 (e.g., device 100iii is blocked by chair in space 760), then each un-configured media device (100i, 100iii) may wirelessly signal (e.g., using RF 107) a status report to media device 100ii and media device 100ii may then instruct one or both of the un-configured media devices (100i, 100iii) to switch to AV system 107 for acoustic wireless communications as described in FIGS. 7A-7C. Similarly, as another example, in FIGS. 7A-7C, if one or more un-configured media device cannot successfully receive acoustic wireless communications for a configured media device, then the configured media device may instruct one or all of the un-configured media devices to switch to OPT 185 for optical wireless communications. When media devices switch from one wireless means to another wireless means to effectuate successful wireless communications, structure 750 or other may still be effective at preventing/blocking unintended configuration, re-configuration, or control of media devices in un-related ecosystems, such as media device 100iv in space 770. In that the media devices described herein include a plurality of wireless communications systems, any of those systems may be used individually or in combination with other systems to effectuate wireless communications between media devices and/or user devices of the present application.

Configuration Using Co-Location

Figure 8A:
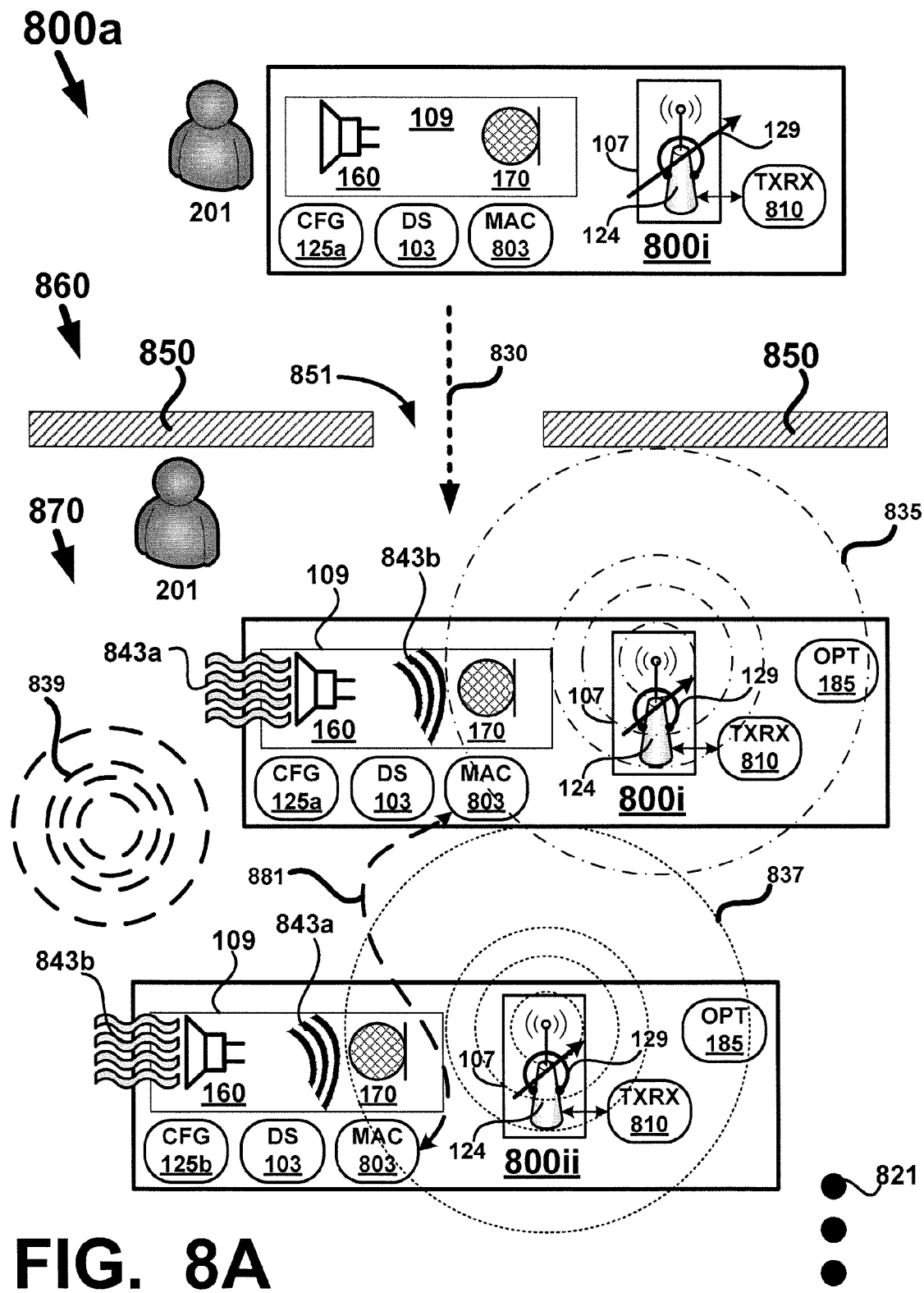
FIGS. 8A through 8B depict block diagrams of media devices including an antenna configured to be de-tuned according to an embodiment of the present application.

Referring now to FIG. 8A, scenario 800a depicts one example of a media devices in which one or more of the media devices include a de-tunable antenna coupled with RF system 107. The de-tunable antenna may be de-tuned by the RF system 107 to determine proximity and location of other RF sources in range of the RF system 107. In a space 860 user 201 has a media device 800i including a RF system 107 having a de-tunable antenna 124 electrically coupled with a transceiver TXRX 810. De-tunable antenna 124 may be de-tuned 129 over a wide range of RF frequencies including but not limited to licensed bands, unlicensed bands, WiFi, WiMAX, cellular, Bluetooth®, ~2.0 GHz-6.0 GHz range, and broadband, just to name a few. In some examples, transceiver TXRX 810 may be one of the transceivers depicted in RF system 107 in FIG. 1 (e.g., BT 120, WiFi 130, AH 140, and 150). In other examples transceiver TXRX 810 may be a dedicated transceiver. In FIG. 8A, for purposes of explanation, it is assumed that media device 800i has already been configured as described herein and denoted by CFG 125a. Each media device may include a list MAC addresses MAC 803 that may be used to store a registry of MAC address for media devices associated with an ecosystem of user 201. For example, if user 201 has 12 media devices in his/her ecosystem, then there would be at least 12 specific MAC addresses pre-registered in MAC 803 of each media device that corresponds to twelve media devices in the users ecosystem. MAC 803 may also include MAC addresses for other wireless and network devices (e.g., Ethernet, WiFi routers, WiFi switches etc.). Those devices may be associated with wireless and other network components that the user's media devices may need to communicate with (e.g., for Internet or intranet access). MAC 803 may be a portion of the data stored in DS 103 (e.g., stored in Flash memory, etc.).

In scenario 800a, the user 201 has other media devices in his/her ecosystem and the user 201 has configured (e.g., CFG 125a) media device 800i to playback music from a playlist using media files located on a computer system (not shown) that the media device 800i accesses via its RF system 107 (e.g., via WiFi 130). The user listens to playback in space 860 in mono (e.g., a single SPK 160 producing music from the Left and Right channels of the audio stream) from the single media device 800i. However, through CFG 125a, user 201 has configured (e.g., using APP 225) media device 800i to wirelessly connect with another media device when those devices are in co-located proximity to one another, to playback the audio stream in stereo where one media device produces the left channel and another media device produces the right channel.

For example, user 201 transports 830 media device 800i from the space 860 through a doorway 851 in a building wall 850 to a space 870. In space 870 the user 201 has another media device 800ii. Media device 800ii generates an RF field 837. When antenna 124 is de-tuned 129 by the RF system 107 of media device 800i, RF system 107 is configured to detect RF fields of other media devices (e.g., 837 of 800ii). Typically, there may also be other RF fields present that are not related to those generated by the media devices, such as RF field 839 that may be from a WiFi network, cellular phone, WiMAX network, etc. Media device 800i detects RF fields 839 and 837. Media device 800i determines that RF field 837 from media device 800ii is associated with a MAC address that is pre-registered in MAC 803 for device 800i. However, although RF field 839 may be associated with a MAC address, that MAC address is not pre-registered in MAC 803 of media device 800i. In some examples, the MAC address from devices other than media devices (e.g., 839) may not be detectable or otherwise unavailable, and in that case the media device may be configured to ignore that MAC address or assume that MAC address is not pre-registered in its MAC 803. In some examples, media device 800i may be generating its own RF field 835 and media devices 800i and 800ii may check their respective MAC 803 to see if each device has the MAC address of the other device pre-registered in its MAC 803.

Based on CFG 125a, the user 201 intends that media device 800i transmit a copy of its CFG 125a to media device 800ii which is currently storing CFG 125b which is different than CFG 125a. In some other examples, media device 800ii may be un-configured (not shown) as described above. Here, media devices 800i and 800ii may hand shank the necessary wireless signals (e.g., RF, acoustic, optical) to effectuate transfer of CFG 125a from 800i to 800ii. Recognition that each media device is listed in the MAC 803 of the other media device may be accomplished using any form of wireless signaling as described above. For example, in FIG. 8A, device 800i may acoustically signal 843a that device 800ii is pre-registered in its MAC 803 and device 800ii receives 843a the acoustic signal at its MIC 170. Similarly, device 800ii may acoustically signal 843b that device 800i is pre-registered in its MAC 803 and device 800i receives 843b the acoustic signal at its MIC 170. Those acoustic signals may serve as sufficient acknowledgement by devices 800i and 800ii for the transfer of CFG 125a from 800i to 800ii via wireless (e.g., AH 140, BT 120, or WiFi 130), acoustic, or optical (not shown) processes.

Figure 8B:
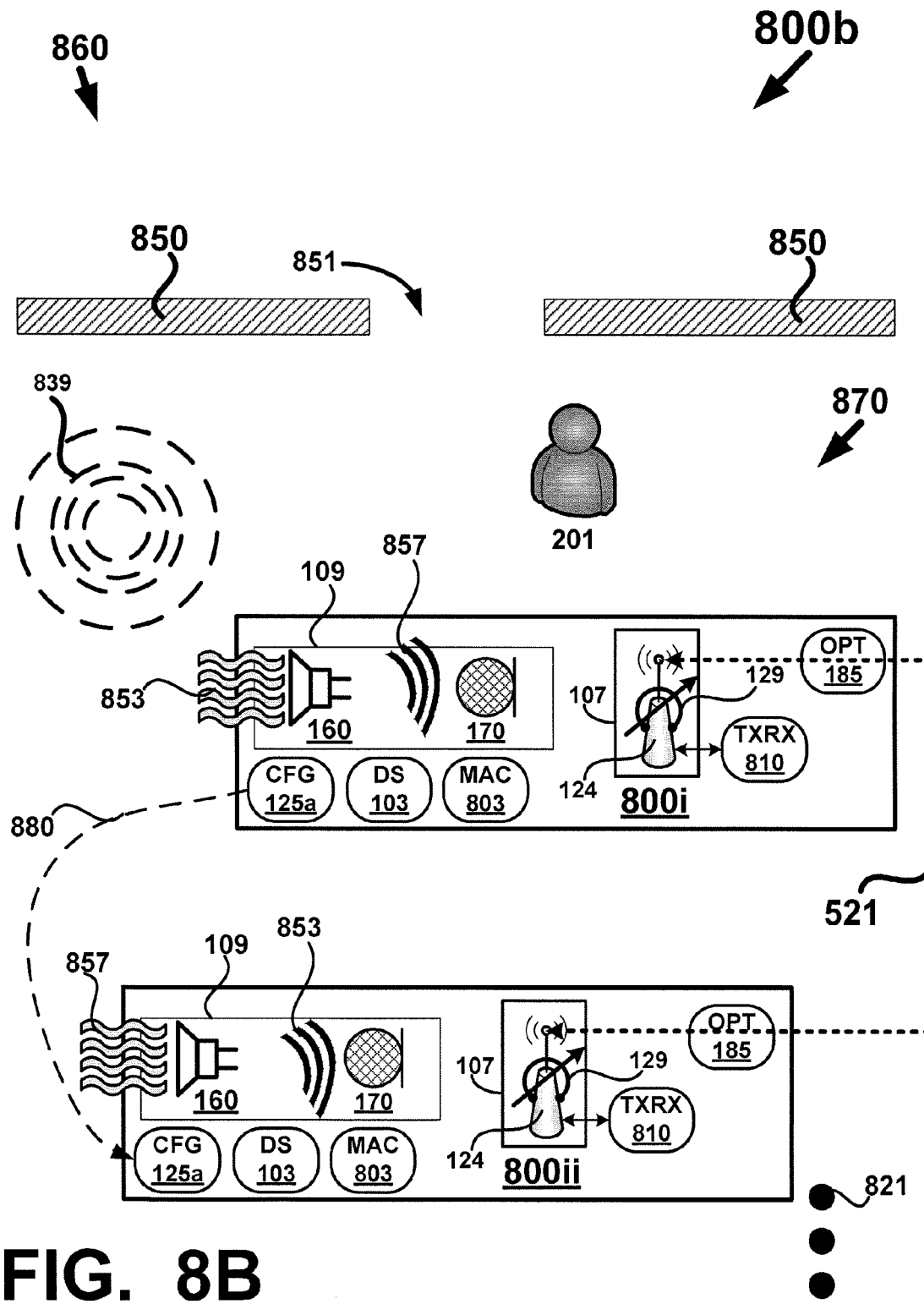

In FIG. 8B, transfer 880 of CFG 125 to 800ii has occurred as depicted by scenario 800b. Devices 800i and 800ii may acoustically acknowledge that the transfer 880 was successful via signals 853 and 857. Post-configuration, media devices 800i and 800ii may switch to WiFi 130 for wireless communications 521 with each other. As before, there was no need for the user 201 to do anything to effectuate the re-configuration of 800ii other than bringing 800i and 800ii into co-location with each other. Furthermore, there is no need to make or break BT pairing connections between media devices and user devices.

Referring again to FIG. 8A, in an alternate example, RF system 107 using the de-tuned 129 antenna 124 on device 800i may detect that the RF fields 837 and 839 are WiFi signals and couple WiFi 130 (if not already coupled) with antenna 124 and switch to a WiFi monitor mode where RF system 107 sniffs for packets in the WiFi signals being received by WiFi 130. Each sniffed packet is analyzed for MAC addresses that are compared with the MAC addresses listed in MAC 803 of device 800i. MAC address for device 800ii is listed in the registry, but MAC address for whatever device is generating RF field 839 is not listed in the registry. Co-location of 800i in proximity with 800ii as detected by de-tuned 129 antenna 124 and the presence of the MAC address for 800ii in the registry of 800i allows for communication and/or interaction between 800i and 800ii for tasks such as wirelessly transferring CFG 125a to 800ii, media device re-configuration, media device control, or other tasks that may be configured into the hardware and/or software of media devices described herein.

In FIG. 8A, both media devices 800i and 800ii are depicted as including antennas 124 that may be de-tuned 129; however, in some examples, there may be media devices with antennas that are not de-tuned 129 such as antenna 124 sans de-tuning functionality. Although only two media devices 800i and 800ii are depicted in FIG. 8A more media devices may be used in scenario 800a as denoted by 821. MAC addresses in MAC 803 may be pre-registered by the APP 225 as described above. For example, each time a new media device is added to the user's ecosystem, the APP 225 may register a MAC address for each newly added device in the MAC 803 of other media devices in the ecosystem, thereby pre-registering the MAC address for future use. In other examples, optical wireless communications (e.g., using OPT 185) as described above in reference to FIGS. 7C-7D may be used to in place of or in conjunction with the wireless communications between co-located media devices depicted in FIGS. 8A-8B.

Although the foregoing examples have been described in some detail for purposes of clarity of understanding, the above-described conceptual techniques are not limited to the details provided. There are many alternative ways of implementing the above-described conceptual techniques. The disclosed examples are illustrative and not restrictive.

What is claimed is:

1. A device, comprising:
   a controller in electrical communication with:
   a data storage system including non-volatile memory;
   an input/output (I/O) system;
   a radio frequency (RF) system including at least one RF antenna electrically coupled with:
   a first transceiver configured to wirelessly communicate using a first protocol;
   a second transceiver configured to wirelessly communicate using a second protocol that is different than the first protocol; and
   an ad hoc (AH) transceiver configured to wirelessly communicate only with other devices having the AH transceiver using a third protocol that is different than the first and second protocols;
   an audio/video (A/V) system including a loudspeaker electrically coupled with a power amplifier and a microphone electrically coupled with a preamplifier;
   a power system configured to supply electrical power to the controller, the data storage system, the I/O system, the RF system, and the A/V system;
   an instruction set stored on the data storage system, the instruction set being configured to activate a wireless protocol discovery mode on a user device configured for wireless communication, to power up a first media device associated with the first transceiver, to activate a wireless protocol pairing mode on the first media device, to wireless pair the first media device with a user device, to couple the user device with a wireless data network, to install an application on the user device using the wireless data network, the application comprising another instruction set stored on a non-transitory computer readable medium, the another instruction set being configured to use the application to configured the first media device, and to couple the first media device to the wireless data network, the another instruction set also being downloaded to one or more other media devices associated with the second transceiver and the ad hoc (AH) transceiver, each of the one or more other media devices having an address to which the another instruction set is configured to be downloaded, the address being used by the application to determine an operating system associated with the one or more media devices.

2. The device of claim 1, wherein at an initial power up, the controller commands the first transceiver to listen for a pairing signal from a user device, and upon successfully pairing with the user device, to wirelessly receive data that is used by the controller to control operation of the data storage, I/O, RF, audio, and power systems.

3. The device of claim 2, wherein the data comprise a user specific configuration that is stored in the non-volatile memory.

4. The device of claim 2, wherein the data comprises instructions used by the controller to command the second transceiver to join a designated WiFi network, the data including a uniform resource identifier (URI) for an Internet address where a user specific configuration is located, and the controller uses the designated WiFi network to download the user specific configuration into the non-volatile memory.

5. The device of claim 4, wherein the URI comprises a uniform resource locator (URL).

6. The device of claim 1, wherein the controller comprises at least one integrated circuit (IC) selected from the group consisting of a microprocessor ($\mu$P), a microcontroller ($\mu$C), a digital signal processor (DSP), a field programmable gate array (FPGA), and an application specific integrated circuit (ASIC).

7. The device of claim 1, wherein the non-volatile memory includes a user specified configuration.

8. A method for configuring media devices in an ecosystem, comprising:
   activating a Bluetooth (BT) discovery mode on a user device configured for BT communication;
   powering up a first media device;
   activating BT pairing mode on the first media device;
   BT pairing the user device with the first media device;
   connecting the user device with a wireless network;
   installing an application (APP) on the user device using the wireless network, the APP comprised of a non-transitory computer readable medium;
   using the APP to create a configuration (CFG) to be installed on the first media device, the CFG comprised of a non-transitory computer readable medium;
   installing the CFG on the first media device; and
   connecting the first media device to the wireless network, the CFG also being configured to be downloadable to one or more other media devices to configure the one or more other media devices, each of the one or more other media devices having an address to which the CFG is configured to be downloaded, the address being used by the APP to determine an operating system associated with the one or more other media devices on which the CFG is to be downloaded.

9. The method of claim 8, wherein the wireless network comprises a WiFi network.

10. The method of claim 8, wherein the APP is installed from a location on the Internet.

11. The method of claim 8, wherein the APP is installed from an application store.

12. The method of claim 8, wherein the wireless network comprises a cellular network.

13. The method of claim 8 and further comprising:
    using the APP to install the CFG on a second media device without establishing a BT pairing between the user device and the second media device.

14. The method of claim 13 and further comprising:
    maintaining the BT pairing between the first media device and the user device.

15. The method of claim 13 and further comprising:
    wirelessly communicating data between the first media device and the second media device using an Ad Hoc (AH) wireless network established only between the first and second media devices.

* * * * *